A. T. BROWN.
ELECTRIC EXCHANGE SYSTEM.
APPLICATION FILED MAY 28, 1895. RENEWED JULY 16, 1910.

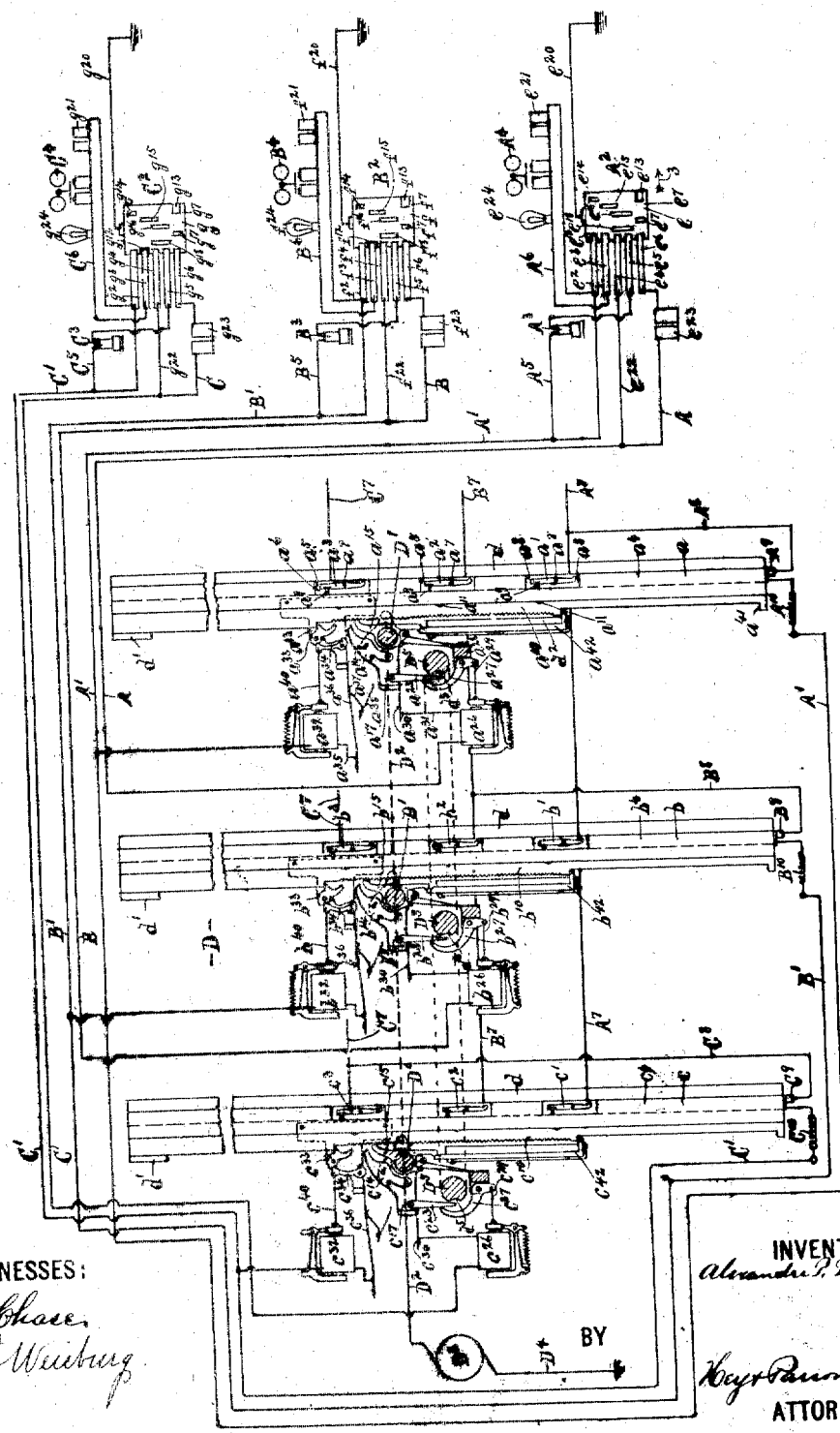

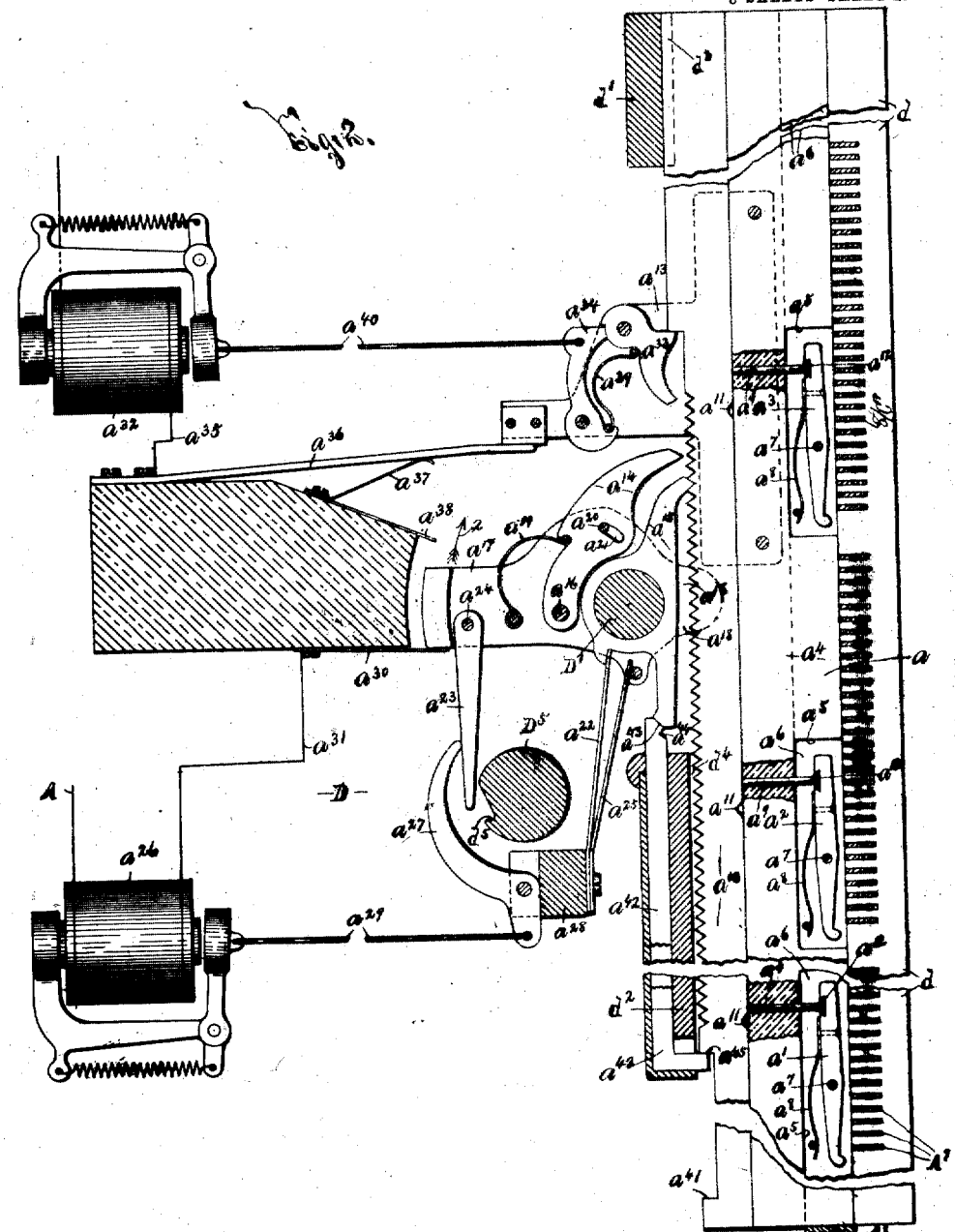

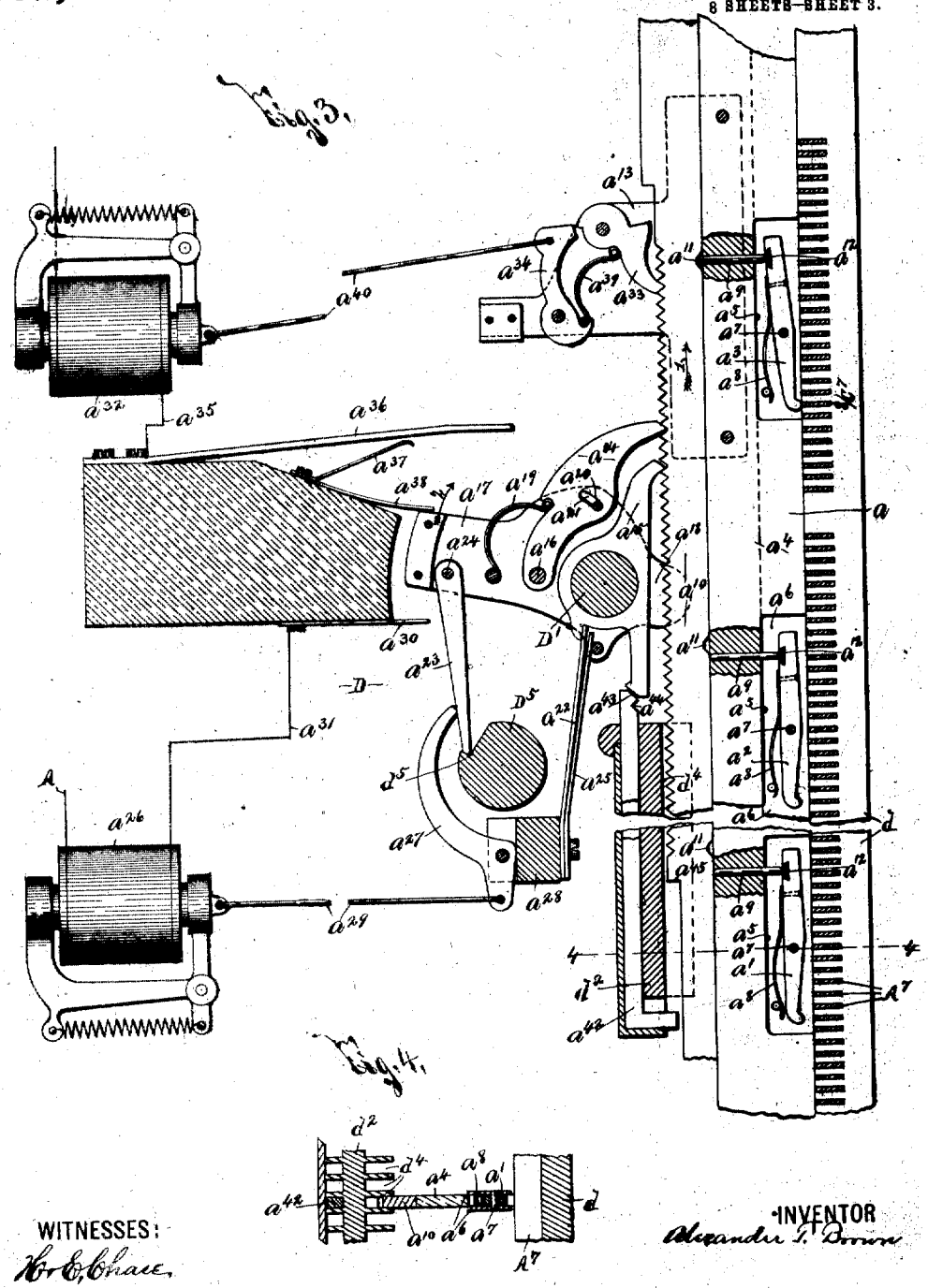

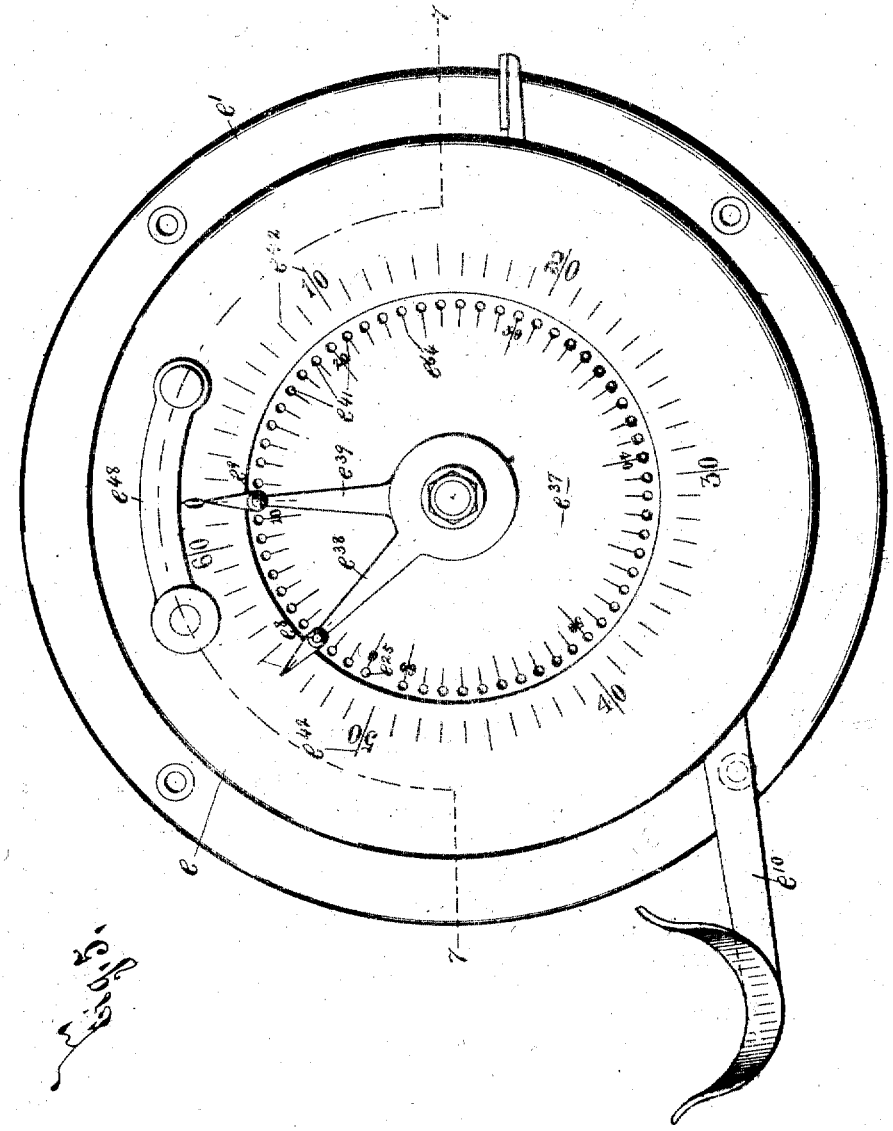

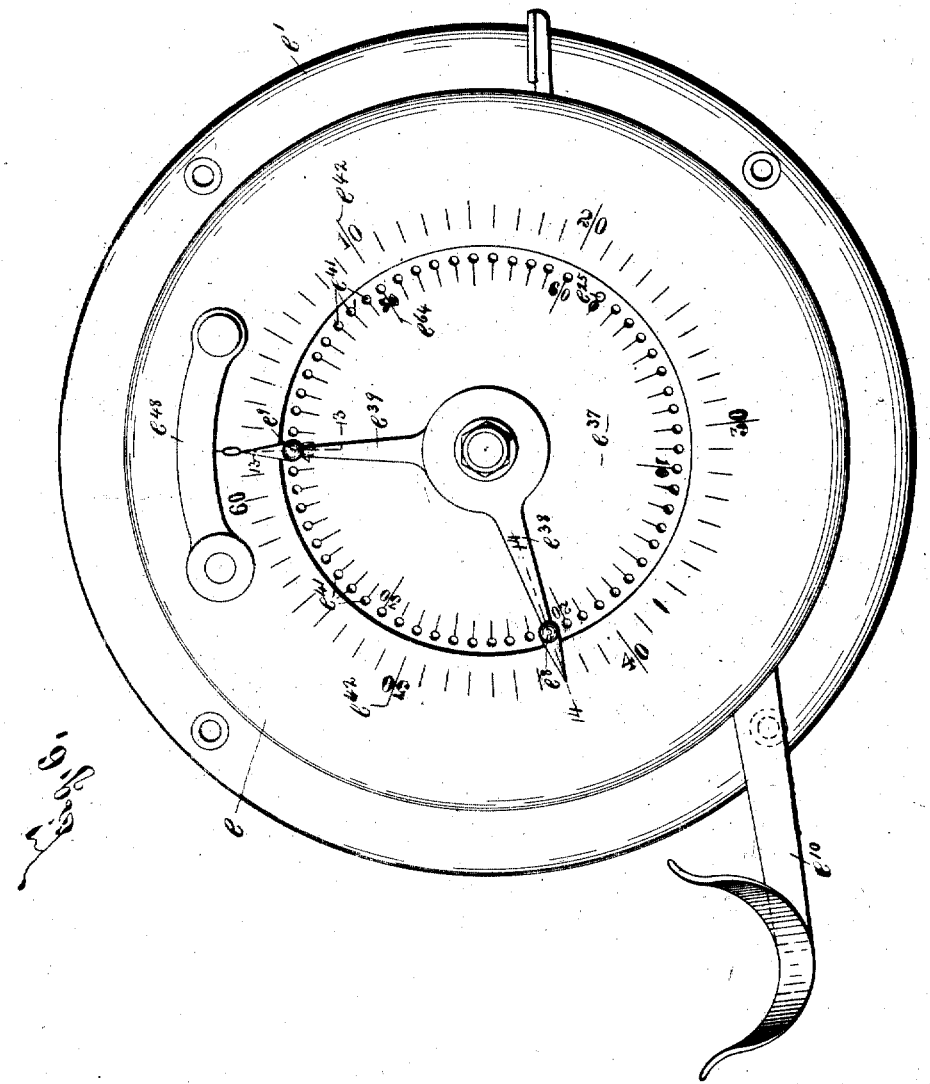

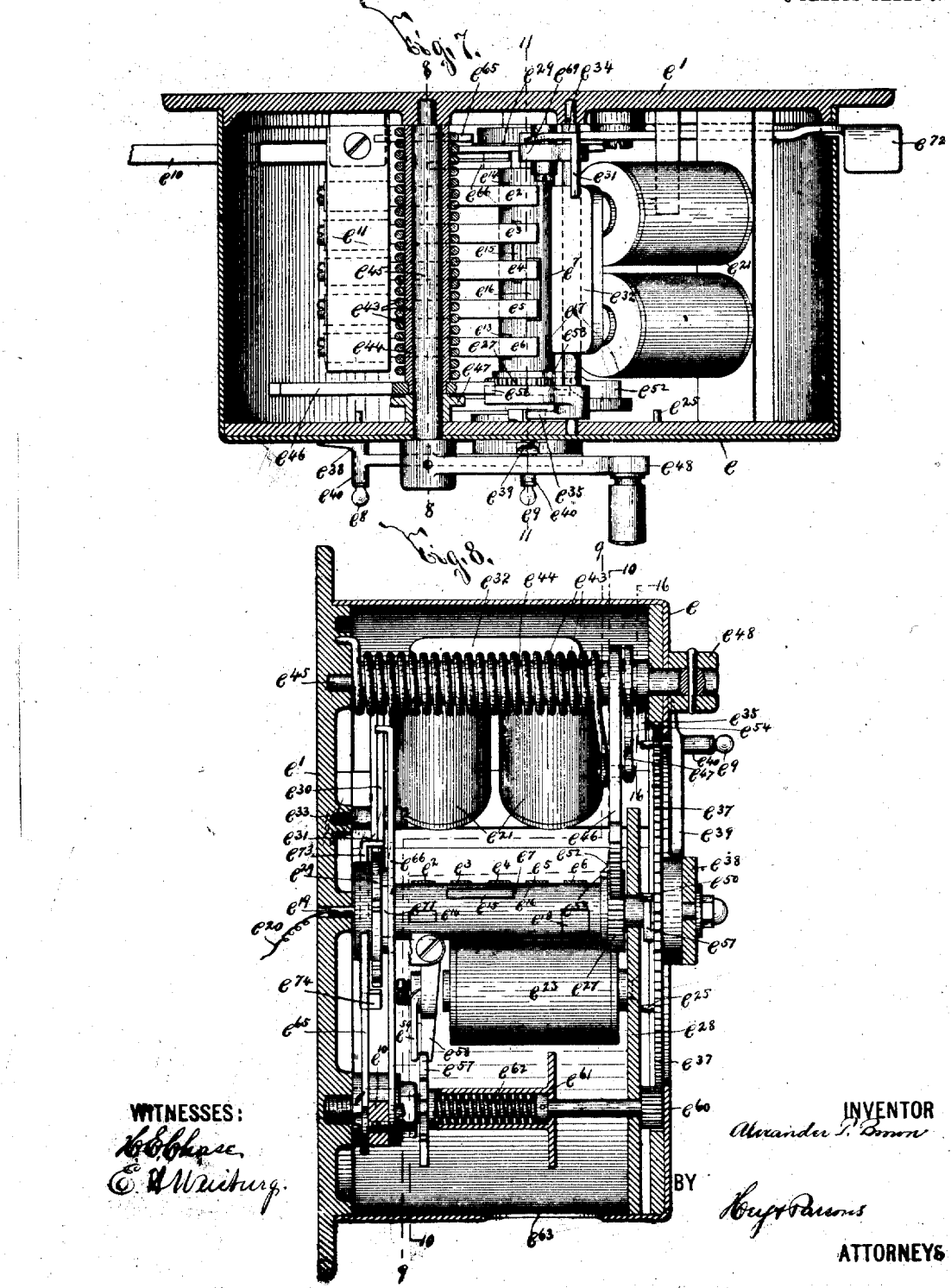

992,333.

Patented May 16, 1911.

8 SHEETS—SHEET 7.

WITNESSES:
H. E. Chase.
E. A. Weitzig.

INVENTOR
Alexander T. Brown

Hey & Parsons
ATTORNEYS.

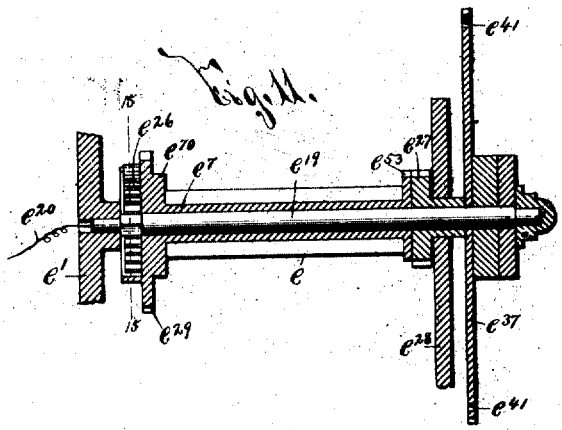
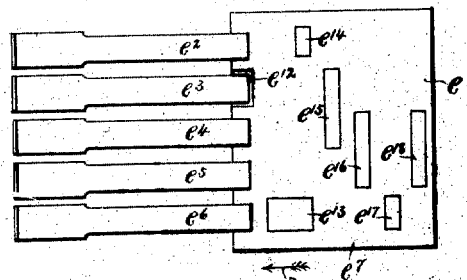
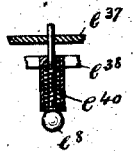
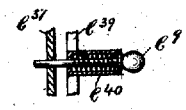
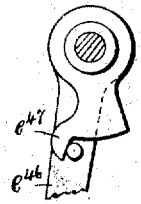
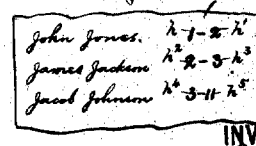

UNITED STATES PATENT OFFICE.

ALEXANDER T. BROWN, OF SYRACUSE, NEW YORK, ASSIGNOR TO WILBERT L. SMITH, TRUSTEE.

ELECTRIC EXCHANGE SYSTE..

992,333.      Specification of Letters Patent.      Patented May 16, 1911.

Application filed May 28, 1895, Serial No. 550,933. Renewed July 16, 1910. Serial No. 572,282.

*To all whom it may concern:*

Be it known that I, ALEXANDER T. BROWN, of Syracuse, in the county of Onondaga, in the State of New York, have invented new and useful Improvements in Electric Exchange Systems, of which the following, taken in connection with the accompanying drawing, is a full, clear, and exact description.

My invention relates to improvements in electric exchange systems for permitting automatic communication between different circuits as telephonic, telegraphic, &c., and has for its object the production of a simple and practical apparatus for accomplishing the desired result, which is highly effective in operation and necessitates in its use but a minimum degree of skill and manipulation; and to this end it consists essentially in the construction, arrangement, and electric connection of the component parts of the system, all as hereinafter more fully described and pointed out in the claims.

In describing this invention, reference is had to the accompanying drawing, forming a part of this specification, in which like letters and numerals indicate corresponding parts in all the views.

Figure 9:
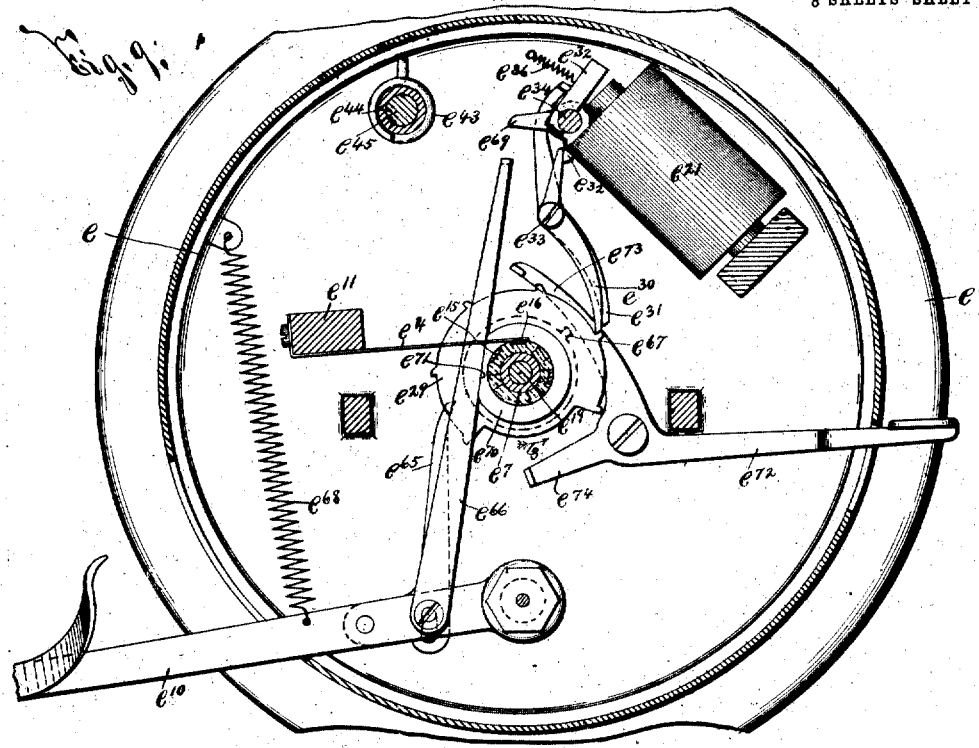
Figure 10:
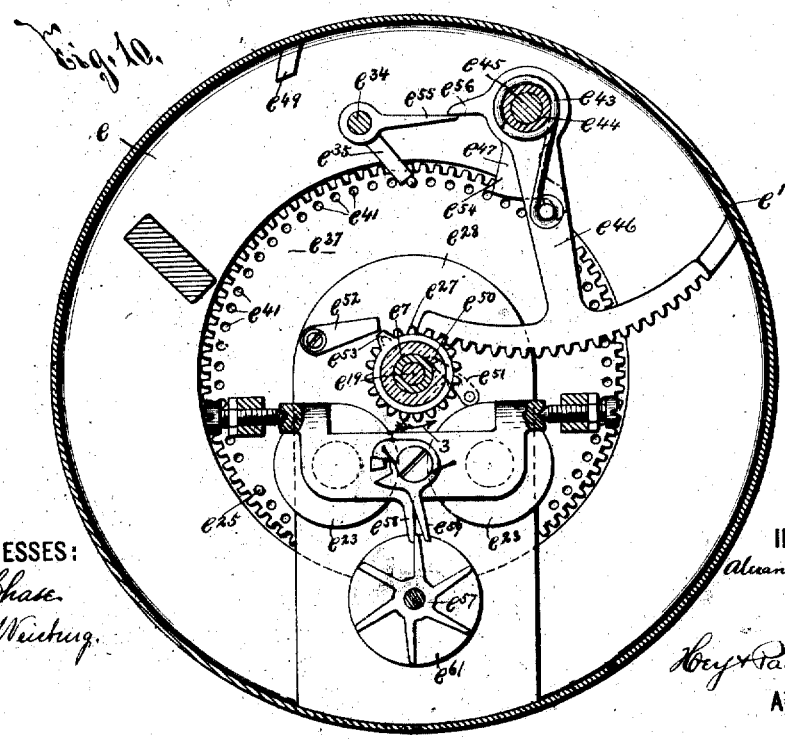

Figure 1 is a diagrammatic view illustrating the general construction and arrangement of an electric exchange system embodying my invention. Fig. 2 is an elevation partly in section, of one of the detached switching apparatus of the system, shown in its normal position. Fig. 3 is an elevation, partly in section, of the switching apparatus seen in Fig. 2, which is here shown in operative position. Fig. 4 is a detail section taken on line 4—4, Fig. 3. Fig. 5 is a face view of one of the controlling devices of the system, its indicators being shown in their position assumed for effecting the movement of the corresponding switching apparatus to the position assumed by the switching apparatus in Fig. 3. Fig. 6 is a face view of the controlling device seen in Fig. 5, its indicators being illustrated in a different position from that assumed in Fig. 5. Fig. 7 is a horizontal section, taken on line 7—7, Fig. 5. Fig. 8 is a vertical section, taken on line 8—8, Fig. 7. Figs. 9 and 10 are vertical sections looking in opposite directions, taken respectively on lines 9—9 and 10—10, Fig. 8. Fig. 11 is a detail section, taken on line 11—11, Fig. 7. Fig. 12 is a top plan view of the brushes or terminals of one of the controlling devices, and the terminal support for engaging said brushes or terminals shown diagrammatically as a flat plate. Figs. 13 and 14 are detail sections, taken, respectively, on lines 13—13 and 14—14, Fig. 6. Figs. 15 and 16 are detail sections, taken respectively on lines 15—15 and 16—16, Figs. 11 and 8; and Fig. 17 is a detail elevation of a part of an index suitable for use with my improved system.

In my improved electric exchange system, each circuit for which automatic connection is desired is provided with a switching apparatus for connecting the same with the other circuits, and a controlling device for governing the passage of the current over the circuit and thereby controlling or effecting the operation of the switching apparatus. Both the switching apparatus and the controlling device are preferably of substantially the construction herein illustrated and described, although either may be used without the other, providing the substituted device is capable of effecting the operation of the remaining one of said mechanisms, and various changes may be made in the construction and arrangement of the parts of the switching apparatus and controlling devices as will be pointed out hereinafter. This system although suitable for a small number of circuits, is particularly applicable for a large number, and I have shown the switching apparatus and the controlling devices as of suitable construction for operation with 900 circuits, but a less number may be used therewith, and at Fig. 1 I have illustrated only three switching apparatus and a corresponding number of connected circuits. It requires however, but slight changes in the construction of the switching apparatus and controlling devices to render the same capable of operation in connection with a system having a greater number of circuits than 900.

The separate circuits converge at a common or main station, are each provided with at least one subscriber's station and preferably consist of two line conductors or wires which are so connected by a common conductor, cross connections, switching apparatus, and controlling devices that a metallic circuit is established between any two connected circuits for securing substantially undisturbed intercommunication. The adjacent ends of the line conductors or wires of the separate circuits, their main or common conductor, and the cross connections are preferably so arranged and the switching apparatus so constructed, that a movable terminal for connecting the corresponding circuit with another circuit is required to move but a minimum distance. To facilitate this result each switching apparatus is provided with a series of terminals the number of which is a submultiple, and preferably the square root, of the number of the separate circuits. Each switching apparatus is also preferably utilized to coöperate with the controlling device of the circuit connected by said switching apparatus to the circuit leading therefrom for insuring absolute secrecy between the two connected circuits. It it obvious however, that each switching apparatus may be provided with but a single movable terminal and may be constructed without those features tending to secure secrecy between the connected circuits. In the operation of the switching apparatus, I also preferably avail myself of the same line conductors or wires used for communication between the circuits, and thus reduce the expense of wiring; and when the system contains a large number of circuits, I prefer to use both conductors or wires of each circuit for effecting or controlling the operation of the respective switching apparatus. To facilitate this result the opposite ends of both of the line conductors or wires of the circuits are connected to the ground either normally or at intervals, although it is obvious, that instead of using the ground as a conductor additional wires may be substituted without material departure from this invention. As my present system is particularly applicable for use with a large number of circuits some of which will necessarily be comparatively long, I prefer to actuate the switching apparatus by a suitable motor and to merely govern the movement of each switching apparatus by the corresponding controlling device; but it is apparent that instead of using a separate motor for effecting the operation of the switching apparatus, a magnet may be connected directly to each switching apparatus for producing this movement.

$A A^1$, $B B^1$, $C C^1$, represent suitable conductors or wires of a series of circuits, converging at a main or common station D, and provided with subscribers' stations $A^2 B^2 C^2$; $a\ b\ c$ automatic switching apparatus at the station D connected to the adjacent ends of said conductors; and $D^1$ a main or common conductor at the station D connected to each of said switching apparatus and connected by a conductor or wire $D^2$ to a suitable source of electric energy as a dynamo $D^3$ preferably grounded by a conductor or wire $D^4$. The subscribers' stations $A^2 B^2 C^2$ are provided with suitable telephones or other communicators $A^3 B^3 C^3$, and signals $A^4 B^4 C^4$, which it is unnecessary to herein illustrate or describe as their construction forms no essential feature of this invention; and these telephones and the magnets of said signals are connected in circuit with conductors or wires $A^5 A^6$, $B^5 B^6$, $C^5 C^6$, which will be referred to in describing the controlling devices. The conductors or wires $A^1 B^1 C^1$ are provided with fixed contact-terminals $A^7 B^7 C^7$ arranged preferably in parallel at the main or common station D, and the switching apparatus $a\ b\ c$ are formed with movable terminals $a^1 a^2 a^3$, $b^1 b^2 b^3$, and $c^1 c^2 c^3$, which contact with said fixed terminals and are mounted on suitable supports $a^4 b^4 c^4$, forming parts of the respective switching apparatus $a\ b\ c$. The fixed contact-terminals preferably extend longitudinally across the paths of all of the movable terminals of the switching apparatus, but it is obvious that each circuit may be provided with a separate fixed terminal for each switching apparatus. Said fixed contact-terminals $A^7 B^7 C^7$ may consist of separated wires or, as illustrated, of comparatively thin bars separated by suitable insulation $d$.

Suitable cross conductors $A^8 B^8 C^8$ extend from the fixed contact-terminals $A^7 B^7 C^7$ and may connect directly to their respective circuit conductors $A^1 B^1 C^1$, although in order to aid in insuring secrecy when two circuits are connected, these cross conductors $A^8 B^8 C^8$ terminate at circuit breakers $A^9 B^9 C^9$ which are connected by conductors or wires $A^{10} B^{10} C^{10}$ to said circuit conductors $A^1 B^1 C^1$ and are operated by the respective switching apparatus, $a\ b\ c$, as presently described. Each switching apparatus is here shown as provided with a plurality of movable terminals, and consequently each movable terminal engages only a limited number of the fixed contact-terminals, and if desired the first terminal of the series engaged by one of the movable terminals may be slightly separated from the last terminal of the series engaged by the next adjacent movable terminal, as illustrated at Figs. 2 and 3, although this arrangement is not essential. The number of the movable terminals of each switching apparatus preferably equals the square root of the number of the circuits of the system, but the number of said movable terminals may be either greater or less than said square root although it should be a submultiple of the total number of said circuits. The switching apparatus here illustrated being designed for use with 900 electric circuits, is therefore preferably provided with 30 movable terminals, and the fixed contact-terminals of the circuits are divided into 30 series each containing the terminals of 30 circuits. I have not deemed it necessary or advisable to illustrate either the entire number of fixed contact-terminals, or a terminal support provided with 30 movable terminals, but at Fig. 2 I have shown two entire series of 30 fixed contact-terminals and two movable terminals $a^2$ $a^3$ of the switching apparatus as presently described, suitably separated from each other for engaging the fixed terminals of each of said series. The remaining fixed and movable terminals of my electric exchange system are arranged similar to the like terminals previously referred to, and the terminal support of each switching apparatus is required to move only as far as any one of its movable terminals. It is obvious however that if the switching apparatus are each provided with a greater or less number of movable terminals, that their terminal supports will be required to move a less or greater distance.

The switching apparatus of my exchange system are all of the same construction and in order to simplify the description of this invention I will specifically describe only the one $a$. The terminal support $a^4$ of said apparatus $a$ preferably consists of a reciprocating insulating bar or strip formed with cutouts $a^5$ for receiving the movable terminals $a^1$ $a^2$ $a^3$, &c., which are electrically connected by a suitable conductor as a bar or strip $a^6$, secured to said support $a^4$ and connected to the movable conductor $A^{10}$. It is desirable that the terminals $a^1$ $a^2$ $a^3$ may move independently, and they are therefore preferably secured to the conductor $a^6$ by conducting pivots $a^7$ and are normally held out of operative position against the action of springs $a^8$ arranged in the cutouts $a^5$. The means for holding the movable terminals out of operative position preferably consists of pins or rods $a^9$, moved lengthwise in apertures or guides in the support $a^4$, by a reciprocating rack $a^{10}$, presently described, which is provided with cutouts $a^{11}$ arranged one in advance of the other, for permitting the springs $a^8$ to successively force said pins or rods into inoperative position and to successively force the movable terminals $a^1$ $a^2$ $a^3$ into their plane of engagement with the fixed terminals $A^7$ $B^7$ $C^7$. The pins or rods $a^9$ preferably engage the movable terminals $a^1$ $a^2$ $a^3$, but electrical connection between said parts is prevented by insulators $a^{12}$. The movable terminals $a^1$ $a^2$ $a^3$ are however, electrically connected to the conductor or wire $A^{10}$ by the conductor $a^6$ fixed to the support $a^4$, and said conductor $A^{10}$ which is preferably flexible is free to move when the support $a^4$ is advanced to the desired position as presently described.

The rack $a^{10}$ is preferably arranged at one side of the support $a^4$ and is movable independently thereof in the direction indicated by arrow 1, Fig. 3, by a suitable feed controlled by an electrically operated mechanism connected to the circuit leading to the switching apparatus $a$ and composed of the line conductors or wires $A$ $A^1$. The terminal support $a^4$, and the rack $a^{10}$ may be suitably guided in their movement, but the terminal support $a^4$ is shown as interposed between the rack $a^{10}$ and a supporting plate or bar $d$, preferably formed of insulating material and arranged in substantially the same plane as the engaging faces of the fixed contact-terminals $A^7$ $B^7$ $C^7$. The rack $a^{10}$ is interposed between the terminal support $a^4$ and cross bars $d^1$ $d^2$ arranged at the outside of said rack, and said cross bars may be provided with guides $d^3$ $d^4$ for preventing transverse movement of the rack $a^{10}$. The support $a^4$ is provided with projecting arms $a^{13}$ which engage the opposite faces of the rack $a^{10}$ and prevent lateral movement of said support, and if desired, a tongue and groove connection between the adjacent edges of said support and rack, or suitable guide pieces or bars, not necessary to herein illustrate, may be used to prevent lateral movement of the support $a^4$.

The feed for the rack $a^{10}$ may be of any desirable construction but it preferably consists of a feeding dog $a^{14}$, a suitable stop as a dog $a^{15}$, a motor $D^5$ and suitable connections between the feeding dog and the motor. The feeding dog $a^{14}$ is arranged at the outside of the rack $a^{10}$ and is pivoted at $a^{16}$ to a suitable support $a^{17}$ which may be provided with ears $a^{18}$ for guiding the rack $a^{10}$, and is mounted on the main conductor or common conductor $D^1$ consisting preferably of a spindle or pivotal pin. A spring $a^{19}$ normally forces the free end of the feeding dog toward the rack $a^{10}$, but a pin $a^{20}$ secured to the support $a^{17}$ and movable in a slot $a^{21}$ in the feeding dog, normally prevents the engagement of said dog and rack. The pin $a^{20}$ and the slot $a^{21}$ connect the feeding dog to the support $a^{17}$ with a lost motion at a point between the pivot $a^{16}$ and the free end of the dog, and this connection enables the feeding dog to swing on its pivot when engaged with the rack $a^{10}$, until the pin $a^{20}$ reaches the opposite end of the slot $a^{21}$, whereupon the support $a^{17}$ holds said dog firmly in engagement with the rack and prevents undue feeding thereof. The support $a^{17}$ is reciprocated to and fro, as presently described, and each forward movement operates the dog $a^{14}$ to feed the rack $a^{10}$ a single tooth or step. The stop or dog $a^{15}$ prevents return movement of the rack $a^{10}$ and is preferably mounted on the conductor or spindle $D^1$ and normally engaged with the rack $a^{10}$ by a suitable spring $a^{22}$.

The motor $D^5$ for operating the feed for the rack $a^{10}$ may be of any desired form, size, and construction, and the support $a^{17}$ may be suitably connected thereto. In the preferable form of my invention the motor $D^5$ consists of a constantly oscillating shaft which is provided with a lengthwise shoulder $d^5$, and is actuated by any suitable mechanism not necessary to herein illustrate or describe. The connection between said motor and the support $a^{17}$ preferably consists of a movable arm $a^{23}$ having one end pivoted at $a^{24}$ to the outer end of the support $a^{17}$ and its opposite end movable into engagement with the shoulder $d^5$. As the arm $a^{23}$ is engaged with the shoulder $d^5$, as presently described, the support $a^{17}$ is rocked on the conductor or spindle $D^1$ in the direction shown by arrow 2, Figs. 2 and 3, against the action of a spring $a^{25}$ and operates the feeding dog $a^{14}$ to advance the rack $a^{10}$ a single tooth. The spring $a^{25}$ then operates to return the support $a^{17}$ and gravity is utilized to facilitate said movement and to hold the arm $a^{23}$ in its normal position, since I preferably arrange the terminal support $a^4$ and the rack $a^{10}$ in a vertical plane. It is obvious however that if the parts $a^4$ $a^{10}$ are otherwise arranged, a suitable spring may be utilized to return the arm $a^{23}$.

The electrically operated mechanism for connecting the feeding dog support with the motor $D^5$ may be of any desirable form, size, and construction, but it preferably consists of a magnet $a^{26}$ in circuit with the conductor or wire A, and a lever $a^{27}$ pivoted to a suitable support $a^{28}$ and having one end connected by a link $a^{29}$ to the armature of said magnet and its opposite end engaged with the movable arm $a^{23}$, for forcing the same into engagement with the shoulder $d^5$ of the motor $D^5$. As will be presently described, the passage of the current through the magnet $a^{26}$ is governed by a suitable controlling device $e$, but in order that the operation of the switching apparatus may be positively assured, a suitable circuit breaker is connected to the line conductor or wire A in proximity to the switching apparatus $a$ for breaking the circuit through said conductor at each movement of the rack $a^{10}$, and the break in said circuit is utilized to advance the operating pieces of the controlling device, presently described, which regulate the operation of said controlling device. Any suitable circuit breaker may be used for this purpose, and I have here illustrated one of simple construction consisting of a terminal $a^{30}$ connected to a wire $a^{31}$ leading from the magnet $a^{26}$ and detachably engaged with the upper end of the feeding dog support $a^{17}$, which is formed of electric conducting material and permits the passage of the current from the terminal $a^{30}$ to the main or common conductor $D^1$.

As the feeding dog support $a^{17}$ is moved onwardly from its normal position for advancing the rack $a^{10}$ a single step, the upper end of said support is separated from the terminal $a^{30}$ and the circuit through the line conductor or wire A is thus broken until said support assumes its normal position in engagement with the terminal $a^{30}$; whereupon a current may be again passed through the line conductor or wire A for engaging the arm $a^{23}$ with the motor $D^5$ and thereby effecting a second advance movement of the rack $a^{10}$. Consequently, as the break in the circuit through the conductor or wire A, is dependent upon each movement of the rack $a^{10}$ and the movement of the operating pieces of the controlling device $e$, presently described, which regulate the operation of said controlling device is dependent upon each break of the circuit through the conductor or wire A, it is obvious that the magnet $a^{26}$ remains energized for connecting the feeding dog support with the motor $D^5$ until said parts are connected and the feeding dog support commences its onward movement. Moreover, no additional current pulsation is passed through the conductor or wire A for operating the switching apparatus $a$ until the support $a^{17}$ is in its normal position and again restores the circuit through the line conductor or wire A.

The rack $a^{10}$ is moved lengthwise as described until the desired movable terminal of the corresponding support $a^4$ has been forced into operative position, whereupon the rack is connected by any suitable mechanism to said support $a^4$ for moving the same lengthwise until said movable terminal engages the desired fixed contact-terminal. Said connecting mechanism preferably consists of a magnet $a^{32}$ connected in circuit with the line conductor or wire $A^1$, a connecting dog $a^{33}$ pivoted to one or both of the ears $a^{13}$ of the support $a^4$ and movable into engagement with the rack $a^{10}$, and a stop or dog $a^{34}$ for normally holding the connecting dog out of operative position.

The magnet $a^{32}$ may be connected to the grounded main conductor $D'$ by any suitable means, but I have here shown said magnet as connected thereto by a wire $a^{35}$, the feeding dog support $a^{17}$, and conducting springs $a^{36}$ $a^{37}$ $a^{38}$ interposed between said wire and support. The wire $a^{35}$ is suitably connected to the spring $a^{36}$, which is normally engaged with the spring $a^{37}$. The spring $a^{38}$ is suitably secured to the spring $a^{37}$ and its free end is engaged by the outer end of the feeding dog support $a^{17}$, when in its advance position as seen at Fig. 3. The spring $a^{36}$ tends to move outwardly from engagement with the spring $a^{37}$, Fig. 3, but is normally held in position for engaging said spring $a^{37}$ by one of the arms $a^{13}$ of the terminal support $a^4$. Upon the first onward movement of the terminal support $a^4$ the spring $a^{36}$ moves outwardly to its inoperative position and the circuit through the line conductor or wire $A^1$ to the conductor $D^1$ is broken and is not again established until the return of said support to its normal position, as presently described. A spring $a^{39}$ is utilized to force the connecting dog $a^{33}$ into engagement with the rack $a^{10}$, and a link $a^{40}$ of considerable length is interposed between the stop dog $a^{34}$ and the armature of the magnet $a^{32}$. As the magnet $a^{32}$ is energized, the stop or dog $a^{34}$ is withdrawn from operative position and the connecting dog $a^{33}$ is engaged with the rack $a^{10}$ by the spring $a^{39}$, whereupon the support $a^4$ is fed to the desired position by said rack. During this movement of the support $a^4$, the stop or dog $a^{34}$ swings outwardly on its pivot for preventing stoppage of the support by the link $a^{40}$.

As previously described, the rack $a^{10}$ permits the movable terminals to assume their operative position, is connected to the support $a^4$ as soon as the desired movable terminal is in operative position, and moves the support $a^4$ from its normal position until said movable terminal is in engagement with the desired fixed contact-terminal. The terminal support $a^4$, as previously stated, is provided with thirty movable terminals, which are so arranged that when one first assumes operative position it is separated one step from the first terminal of the adjacent series of fixed contact-terminals. Consequently, to engage the first movable terminal $a^1$ of the support $a^4$ with the first one of the adjacent series of fixed contact-terminals, it requires one movement of the feed for the rack $a^{10}$ to permit the terminal $a^1$ to assume its operative position and a second movement of said feed to engage the terminal $a^1$ with said fixed contact-terminal. It, therefore, requires sixty movements of said feed to engage the last movable terminal not illustrated of the support $a^4$ with the last fixed contact-terminal engaged thereby, and to thus connect the circuit leading from the switching apparatus $a$ to the nine hundredth circuit of the system.

After two circuits have been connected by the switching apparatus $a$, it is desirable for the switching apparatus to again assume its normal position, and this result may be effected by any suitable mechanism. The switching apparatus $a$ and the corresponding controlling device $e$ are, however, preferably of such construction, that after the desired communication through said connected circuits has been secured, the controlling device $e$ operates to permit the passage of electric current pulsations through the magnet $a^{32}$ until the rack $a^{10}$ has passed beyond its position assumed when connecting the circuit leading from the switching apparatus $a$ with the nine hundredth circuit. This additional movement of the rack $a^{10}$ which preferably consists of two advances or steps is utilized to effect automatic return of said rack and the support $a^4$ to their normal position. To permit of this result a shoulder $a^{41}$ secured to said rack, and thus connected to the terminal support $a^4$, engages an operating piece $a^{42}$ of suitable construction for forcing the stop $a^{15}$ from operative position. The automatic return by gravity of the support and rack $a^4$ $a^{10}$ is thus permitted and may be accelerated by weighting said parts. The operating piece $a^{42}$ is of suitable construction, but preferably consists of a reciprocating bar guided in the cross bar $d^2$ and having one end provided with a shoulder arranged in the path of the shoulder $a^{41}$, and its opposite end provided with a cam face $a^{43}$ for engaging an arm upon the stop $a^{15}$ and rocking said stop on the conductor or spindle $D'$ until its engaging end is withdrawn from the rack $a^{10}$. The operating piece also preferably holds the stop $a^{15}$ out of operative position and is therefore provided with a notch $a^{44}$ for receiving a corresponding tooth provided upon said stop. As the rack $a^{10}$ assumes its normal position, a suitable shoulder $a^{45}$ thereon forces the operating piece $a^{42}$ out of operative position and the stop $a^{15}$ is again engaged with said rack by the spring $a^{22}$.

It is very desirable to secure secret communication between two connected circuits and although this result may be effected by various means, I preferably utilize for its accomplishment the switching apparatus of one of said circuits and the controlling device of the other. When a switching apparatus connects its corresponding circuit with another, the terminal support of said switching apparatus is moved away from its normal position and breaks the circuit from its fixed contact-terminal. The current for connecting two circuits must be passed through the fixed terminal of the called station and thence through the line conductor or wire normally connected thereto, and when the circuit from the fixed contact-terminal of a station is broken, it is impossible to connect with said circuit.

As will be apparent after the description of the operation of the controlling devices of my electric exchange system, the terminal support of the controlling device of a connected or called circuit is forced from its normal position when the circuits are connected for telephonic or other communication, and thus prevents the operative connection of the telephone or other communicator of an additional circuit seeking connection with said called circuit. It is thus obvious that secret communication between two circuits is effected by the switching apparatus of one and the controlling device of the other, and that an additional circuit cannot be connected for intercommunication with either of said connected circuits.

The switching apparatus of the respective circuits of my system preferably operate in connection with suitable circuit breakers for aiding in securing the desired secrecy of communication, and, as I have here illustrated but three switching apparatus $a\ b\ c$, I have shown but three of the circuit breakers $A^9\ B^9\ C^9$, previously mentioned. In order that the construction of said circuit breakers and the operation of the respective switching apparatus necessary for actuating the circuit breakers may be readily apparent, I will now proceed to describe the circuit breaker connected to the switching apparatus $a$. This circuit breaker $A^9$ may be of any desirable form, size, and construction, but it preferably consists of a contact piece secured to one end of the cross conductor $A^8$ and normally contacted with the conductor $a^6$ which is electrically connected to the movable conductor $A^{10}$. Consequently, when the support $a^4$ is in its normal position the conductors $A^8\ A^{10}$ are connected by said circuit breaker and the current is free to pass from the cross conductor $A^8$ over the conductor $A^{10}$ to the line conductor or wire $A^1$. As soon as the support $a^4$ moves from its normal position for connecting one of its movable terminals with the fixed contact-terminal of another circuit, the conductor $a^6$ is disconnected from the circuit breaker $A^9$ and the circuit from the fixed contact-terminal $A^7$ through the cross conductor or wire $A^8$ to the line conductor $A^1$ is broken, and, even though a circuit should be connected with said fixed contact-terminal, it would be cut off from communication with the line conductor or wire $A^1$. As previously stated the controlling device of the called circuit operates to prevent the connection of any additional circuit thereto, but as the detail construction and arrangement of the parts of the controlling devices of my system have not yet been described, the operation of the controlling device for effecting this result will be subsequently pointed out.

As previously stated, the switching apparatus $b\ c$ are of the same construction as the apparatus $a$, and at Fig. 1 I have diagrammatically shown movable terminals $b^1\ b^2\ b^3$, $c^1\ c^2\ c^3$, terminal supports $b^4\ c^4$, racks $b^{10}\ c^{10}$, feeding dogs $b^{14}\ c^{14}$, stops or dogs $b^{15}\ c^{15}$, supports $b^{17}\ c^{17}$, arms $b^{23}\ c^{23}$, magnets $b^{20}\ b^{32}$, $c^{26}\ c^{32}$, levers $b^{27}\ c^{27}$, links $b^{29}\ b^{40}$, $c^{29}\ c^{40}$, terminals $b^{30}\ b^{36}$, $c^{30}\ c^{36}$, connecting dogs $b^{33}\ c^{33}$, stop dogs $b^{34}\ c^{34}$, operating pieces $b^{42}\ c^{42}$ and circuit breakers $B^9\ C^9$ corresponding to the like parts $a^1\ a^2\ a^3\ a^4\ a^{10}\ a^{14}\ a^{15}\ a^{17}$, $a^{23}\ a^{26}\ a^{32}\ a^{27}\ a^{29}\ a^{40}\ a^{30}\ a^{36}\ a^{33}\ a^{34}\ a^{42}$, $A^9$ of the switching apparatus $a$.

The switching apparatus $a\ b\ c$ are arranged side by side and the motor $D^5$ preferably extends crosswise thereof as seen by dotted lines at Fig. 1, in order that it may operate all of said apparatus. The conductor $D^1$ also preferably extends crosswise of the switching apparatus $a\ b\ c$ and forms both a main or common electric conductor therefor, and a support or spindle for the feeding and stop dogs of their respective feed mechanisms. It is obvious however that a separate motor may be used for each switching apparatus and that any other suitable main or common conductor may be utilized for connecting said switching apparatus.

The circuits leading from the stations $A^2$ $B^2\ C^2$ are provided with controlling devices $e\ f\ g$ which are all of the same construction, and, in order to additionally simplify the description of this invention, I will describe only the controlling device $e$ for the circuit leading from the station $A^2$. This controlling device consists of a suitable supporting frame $e^1$, a series of fixed brushes or terminals $e^2\ e^3\ e^4\ e^5\ e^6$, a movable terminal support $e^7$, movable operating pieces $e^8\ e^9$ for automatically operating the terminal support $e^7$, escapements for controlling the movement of said terminal support and operating pieces, and an actuating piece $e^{10}$ for moving the terminal support.

The fixed brushes or terminals $e^2\ e^3\ e^4\ e^5\ e^6$ are of suitable form, size, and construction, are preferably arranged one alongside of the other and are secured to any desirable support $e^{11}$ projecting from the rear wall of the frame $e^1$. The terminal support $e^7$ is provided with suitable terminals $e^{12}\ e^{13}\ e^{14}\ e^{15}$ $e^{16}\ e^{17}\ e^{18}$ for engaging the former terminals $e^2\ e^3\ e^4\ e^5\ e^6$, and in order that rotary motion may be utilized for effecting contact of said terminals, the support $e^7$ preferably consists of a drum mounted on a spindle $e^{19}$ connected to a suitable grounded conductor or wire $e^{20}$. The terminals $e^{12}\ e^{13}\ e^{14}\ e^{17}$ are electrically connected to the spindle $e^{19}$ in any suitable manner, as by contact, and the terminals $e^{15}\ e^{16}\ e^{18}$, which may be designated as surface terminals, are insulated from said spindle.

The controlling device $e$ when suitably adjusted preferably operates automatically for making connection with a desired circuit and during this operation the terminal support $e^7$ is revolved for varying the engagement of the terminals $e^2\ e^3\ e^4\ e^5\ e^6$, $e^{12}\ e^{13}\ e^{14}$ $e^{15}\ e^{16}\ e^{17}\ e^{18}$. The mechanism for revolving the support $e^7$ may be of any suitable form, size, and construction, although it preferably consists of a spring, an escapement for permitting the operation of the spring, and operating pieces $e^8\ e^9$, an actuating piece $e^{10}$ and a magnet $e^{21}$ for operating the escapement. As clearly seen at Fig. 1, the line conductors or wires $A^1\ A$ terminate at the fixed brushes or terminals $e^2\ e^6$; the conductors $A^5\ A^6$, previously mentioned, respectively connect the brushes or terminals $e^5\ e^3$ to the line conductor $A^1$ and the terminal $e^2$; and a conductor or wire $e^{22}$ connects the brush or terminal $e^4$ to the line conductor A. As previously stated, the telephones or other communicators $A^3$ and the magnets of the signals $A^4$ are connected in circuit with the conductors or wires $A^5$ $A^6$, and a second magnet $e^{22}$ and the magnet $e^{21}$ are respectively connected in circuit with the conductors or wires A $A^6$ for controlling the escapements which govern the advance movement of the operating pieces $e^8$ $e^9$ and the terminal support $e^7$. The magnet $e^{21}$ may be formed of wire of high resistance as German silver, for reducing the amperage of the current passed through the conductor or wire $A^6$ when the signals of two connected circuits are operated, but I preferably use for such purpose a separate resistance $e^{24}$ connected in circuit with the conductor $A^6$. This resistance $e^{24}$ usually consists of an electric lamp which is arranged in proximity to the telephone or other communicator $A^3$, and is particularly useful for guiding a subscriber to said telephone when darkness obscures its locality.

The terminal support $e^7$ is preferably so arranged when in its normal or initial position that the terminals $e^{12}$ $e^3$ are in contact, and a current for operating the signal $A^4$ is thus free to pass from a calling circuit over the conductors or wires $A^1$ $A^6$ to the grounded wire $e^{20}$, and in its passage illuminates the electric lamp $e^{24}$ and energizes the magnet of the signal $A^4$. Said current also energizes the magnet $e^{21}$ and tends to move its armature which is connected to operate the escapement for the terminal support $e^7$, but as will be afterward explained, the armature of the magnet $e^{21}$ is prevented from movement at this time and cannot operate said escapement. The telephone or other communicator $A^3$ is arranged in close proximity to the controlling device $e$ and normally restrains the actuating piece $e^{10}$, presently described, from operative position. When the signal $A^4$ is operated as described, by a calling circuit, the subscriber removes the telephone $A^3$ from its normal position and the actuating piece $e^{10}$ reversely rotates the terminal support $e^7$ until the surface terminal $e^{18}$ engages the fixed brushes or terminals $e^4$ $e^5$ and connects the telephone $A^3$ in metallic circuit with the line conductors A $A^1$. This reverse movement of the terminal support $e^7$ breaks the normally grounded circuit through the terminals $e^{12}$ and the conductor $e^{20}$, and, as presently described, thereby controls the connection of the telephone to the line conductors or wires of the calling circuit.

When the controlling device $e$ is utilized to operate the switching apparatus $a$ for connecting another circuit with the conductors A $A^1$, the operating pieces $e^8$ $e^9$ are first placed in the desired position, and a suitable spring for actuating the operating pieces is tensioned, as presently described. The terminal support $e^7$ is then permitted to make its first advance or step in the direction indicated by arrows 3. Figs. 1, 9, 12, for separating the terminals $e^{12}$ $e^3$ and engaging the terminals $e^{15}$ $e^6$, thus disconnecting the ground from the line conductor $A^1$ and connecting the same to the line conductor A which is provided with the magnet $e^{23}$ previously mentioned. The controlling device $e$ then operates automatically to effect onward movement of the rack $a^{10}$ of the switching apparatus $a$, for permitting the desired movable terminal of said apparatus to assume its operative position, as previously described; and upon each advance of said rack, the circuit through the conductor A is broken and the armature of the magnet $e^{23}$ is actuated to permit the advance of the operating pieces $e^8$ $e^9$. The movement of the rack $a^{10}$ and the operating pieces $e^8$ $e^9$ continues until the operating piece $e^8$ reaches its operative position whereupon it permits a second advance or step of the terminal support $e^7$ for connecting the terminals $e^{14}$ $e^2$ and thereby grounding the line conductor $A^1$. This second advance movement of the terminal support $e^7$ is, however, not sufficient to disconnect the terminals $e^{15}$ $e^6$ and thus break the ground connection for the line conductor A, as the terminal $e^{15}$ is of considerable length.

Immediately after the second advance or step of the support $e^7$, the feeding dog support $a^{17}$ engages the terminal $a^{38}$ and a current is free to pass from the main station D through the line conductor $A^1$ for connecting the rack $a^{10}$ of the switching apparatus $a$ to the terminal support $a^4$ as previously described. The controlling device $e$ then continues to advance the rack $a^{10}$ after its connection to the support $a^4$, until the operating piece $e^9$ permits the support $e^7$ to make a third advance or step for disconnecting the terminals $e^{13}$ $e^6$, $e^{14}$ $e^2$ and connecting the terminals $e^{15}$, $e^3$ $e^4$. The signal $A^4$ is then connected in circuit with the line conductors, the current passing from conductor A through conductor $e^{22}$ fixed terminal $e^4$ movable terminal $e^{15}$ of the support $e^7$, fixed terminal $e^5$ conductor $A^6$ to the conductor $A^1$, and the current from the main station D passes from the line conductor A through the controlling device $e$ and the line conductor $A^1$ to the movable terminal of the switching apparatus $a$ in operative position, and thence through the fixed contact-terminal $A^7$ of the connected or called circuit and the normally grounded line conductor leading from said contact-terminal. In its passage through said line conductors, the current energizes the magnet $e^{21}$, operates the signal $A^4$, and energizes and operates the corresponding magnet and signal of the connected circuit.

Upon the operation of the signal of the calling circuit the subscriber of said circuit removes his telephone or other communicator from its normal position, whereupon the terminal support of the adjacent controlling device is reversely moved for connecting said telephone to both of the corresponding line conductors or wires and breaking the ground from said controlling device. The signals of the connected circuits then cease their operation and the magnet $e^{21}$ is deënergized whereupon the terminal support $e^7$ is permitted to make a fourth advance or step for engaging the terminals $e^{16}$ $e^4$ $e^5$ and connecting the telephone $A^2$ in circuit with the line conductors A $A^1$. The subscribers of the connected circuits are then free to communicate with each other over a metallic circuit composed of the line conductors or wires of both circuits, since their corresponding conductors are connected at the main station by the common or main conductor $D^1$ and the switching apparatus $a$.

After the desired communication has been obtained, the telephones or other communicators of the connected circuits are again returned to their normal position, thereby causing the reversely moved terminal support of the called circuit to assume its normal position and permitting a fifth advance or step of the support $e^7$ for connecting the terminals $e^{17}$ $e^6$. The circuit from the main station D is then free to pass through the line conductor A to the grounded conductor $e^{20}$, and consequently the rack $a^{10}$ and the operating pieces $e^8$ $e^9$ continue to advance until the limit of their movement is reached. The last advance movement of the rack $a^{10}$ is utilized to return said rack and the terminal support $a^4$ to their normal position and, during the corresponding movement of the operating pieces $e^8$ $e^9$, a third operating piece $e^{25}$ permits the sixth and last advance or step of the terminal supoprt $e^7$, for separating the terminals $e^{17}$ $e^6$ and engaging the terminals $e^{12}$ $e^3$. The engagement of the terminals $e^2$ $e^3$ $e^4$ $e^5$ $e^6$, $e^{12}$ $e^{13}$ $e^{14}$ $e^{15}$ $e^{16}$ $e^{17}$ $e^{18}$ thus controls the passage of currents from the main station D through the line conductors or wires A $A^1$ for operating the switching apparatus $a$ and the controlling device $e$.

The terminals $e^{12}$ $e^{13}$ $e^{14}$ $e^{15}$ $e^{16}$ $e^{17}$ $e^{18}$ are preferably mounted on a revoluble drum and automatic mechanism is utilized for effecting their engagement and obviating the liability of any mistake incidental to hand operation. Said terminals may be suitably constructed however to permit of their desired engagement by hand, and indeed in some instances, the terminals $e^2$ $e^6$ $e^{13}$ $e^{14}$ $e^{17}$ will be unnecessary. I may also prefer to operate the signals of two connected circuits by some other current than the one passing from the main station D through both line conductors of the calling circuit and the normally grounded line conductor of the called circuit, and in that event, the terminal $e^{15}$ may be dispensed with. It is also obvious that providing these changes are made in the switching apparatus $a$ and the terminals of the controlling device $e$, it may be advisable to somewhat vary the arrangement and engagement of the remaining terminals of said controlling device. Moreover, the magnets $e^{21}$ $e^{23}$ may be connected to the terminal support $e^7$ and the operating pieces $e^8$ $e^9$, so as to directly effect the movement of said parts instead of operating escapements to permit suitable springs to accomplish this result.

As previously outlined, a rotary drum or terminal support, operating pieces, magnets, an actuating piece, and escapements are utilized to effect the desired engagement of the terminals of the controlling device $e$, and although said parts may be of any suitable form, size, and construction, and may be connected in any desired manner, I will now proceed to briefly describe their preferable construction and connections. The drum $e^7$ is loosely mounted on the spindle $e^{19}$ and is revolved thereon by a spiral spring $e^{26}$ having its opposite ends secured to said drum and spindle, Fig. 15. One end of the spindle $e^{19}$ is journaled in the rear wall of the supporting frame $e^1$, and its opposite end in a gear $e^{27}$ having its hub journaled in the supporting wall $e^{28}$ of the frame $e$.

The drum $e^7$ is normally restrained from movement by its escapement which preferably consists of a toothed wheel $e^{29}$, holding dogs $e^{30}$ $e^{31}$, and rocking arms $e^{32}$ for actuating said dogs. The wheel $e^{29}$ is preferably fixed to the drum $e^7$; the dogs $e^{30}$ $e^{31}$ are mounted on a suitable pivot $e^{33}$, and the arms $e^{32}$ are fixed to a rocking shaft $e^{34}$ provided with an arm $e^{35}$. One of the arms $e^{32}$ is preferably utilized as the armature for the magnet $e^{21}$ previously referred to, and a suitable spring $e^{36}$ normally separates said armature arm $e^{32}$ from the pole pieces of the magnet $e^{21}$, thereby permitting the main escapement dog $e^{30}$ to rock into engagement with the adjacent tooth of the wheel $e^{29}$ for preventing onward movement of the support $e^7$, and holding the secondary escapement dog $e^{31}$ out of engagement with said wheel $e^{29}$. The arms $e^{32}$ are rocked from their normal position by the lever which tensions the main driving spring of the controlling device $e$, the operating pieces $e^8$ $e^9$ $e^{25}$, and the magnet $e^{21}$, and are returned to their normal position by the spring $e^{36}$. When the arms $e^{32}$ are moved against the action of the spring $e^{36}$, the main escapement dog $e^{30}$ is forced out of operative position and the secondary escapement dog $e^{31}$ permits a slight onward movement of the drum $e^7$ and then prevents its further movement. As the spring $e^{36}$ returns the arms $e^{32}$, the dog $e^{31}$ is withdrawn from operative position and the support $e^7$ continues the balance of its onward advance or step, until the dog $e^{30}$ engages the tooth next adjacent to that previously engaged thereby.

The operating pieces $e^8$ $e^9$ Figs. 13 and 14 may be of any desirable form, size, and construction, and are capable of assuming a number of different positions in which they are securely held by any suitable means as a support or disk $e^{37}$ which rotates said operating pieces and engages the same with the arm $e^{36}$ for rocking the shaft $e^{34}$ and the arms $e^{32}$ and thereby operating the escapement for the drum $e^7$ to permit the second and third advances or steps thereof. Said operating pieces are preferably secured to indicators or hands $e^{38}$ $e^{39}$ which facilitate their adjustment and are preferably pivoted upon the outer end of the spindle $e^{19}$. The free ends of the indicators or hands $e^{38}$ $e^{39}$ are provided with suitable bearings $e^{40}$ in which the operating pieces $e^8$ $e^9$ are reciprocally movable, and the support or disk $e^{37}$ is preferably formed with a series of apertures $e^{41}$ for receiving the inner ends of said operating pieces. The apertures $e^{41}$ are preferably arranged in a circular series and as the controlling device $e$ is designed for use with a rack $a^{10}$ capable of making 62 steps I preferably use 61 apertures. The operating pieces $e^8$ $e^9$ are free to enter 60 of these apertures and thus assume 60 different positions but one of the apertures is preferably closed by the operating piece $e^{25}$. It is obvious however, that if the 1st and 60th apertures are suitably separated and the operating piece $e^{25}$ is interposed between the same, the 61st aperture may be dispensed with and the operating piece $e^{25}$ otherwise secured to the support or disk $e^{37}$. In order that the operating pieces $e^8$ $e^9$ may be readily placed in the desired position the front wall of the frame $e^1$ is provided with a suitable indicator $e^{42}$ consisting of graduations normally alined with the apertures $e^{41}$ and when the indicators or hands $e^{38}$ $e^{39}$ are directly alined with two of said graduations the operating pieces $e^8$ $e^9$ are free to enter the corresponding apertures $e^{41}$ and are in the desired position for effecting the movement of the terminal support $e^7$ necessary to connect the desired circuit to the conductors A $A^1$.

In order to utilize the controlling device $e$ for actuating the switching apparatus $a$ to connect any desired circuit with the line conductors A $A^1$ it is necessary to place both of the operating pieces $e^8$ $e^9$ in their designed position and consequently each circuit of my exchange system is designated by a combination indicator, which may consist of two separate indicators composed of numerals, letters or other characters arranged in suitable combination for permitting the desired distinction between said indicators.

I preferably use numerals for forming the indicators for the separate circuits, and at Fig. 17 I have shown a suitable index or sheet H as provided with combination indicators $h$ $h^1$, $h^2$ $h^3$, $h^4$ $h^5$, for representing the respective circuits leading to the stations $A^2$ $B^2$ $C^3$. The subscribers for these stations may be John Jones, James Jackson, and Jacob Johnson, and the indicators for the circuits leading from said stations preferably consist of the following combinations 1-2, 2-3, 3-11. At Figs. 3 and 5, I have shown the switching apparatus $a$ and the controlling device $e$ in their positions assumed when connecting with the line conductors A $A^1$ the circuit represented by the combination indicator 3-11. Consequently, the movable terminal $a^3$ is shown at Fig. 3, as engaged with the eighth contact-terminal 8/$C^7$ of the series engaged by said movable terminal, and the operating pieces $e^8$ $e^9$ are shown at Fig. 5, as arranged in the third and eleventh apertures $e^{41}$ of the support or disk $e^{37}$. The line conductor $A^1$ is preferably connected to the first contact-terminal $A^7$ of the series engaged by the movable terminal $a^1$ and as the contact-terminals engaged by the movable terminals of the switching apparatus $a$ are preferably numbered consecutively, it requires eleven advances or steps of the rack $a^{10}$ and the operating pieces $e^8$ $e^9$ to connect the line conductors A $A^1$ with the grounded conductor of the 68th circuit, which is provided with the fixed contact-terminal 8/$C^7$, and is designated by the combination indicator 3-11. It also requires only sixty advances or steps of said rack and operating pieces to connect the line conductors A $A^1$, with the 900th circuit designated by the combination indicator 30-60.

The mechanism for moving the operating pieces $e^8$ $e^9$, preferably consists of a spring $e^{46}$ suitably connected to the support or disk $e^{37}$, and an escapement for controlling the movement of said support or disk. The spring $e^{43}$ preferably encircles a sleeve $e^{44}$ loosely mounted on a rocking spindle $e^{45}$ having its opposite ends journaled in the front and rear walls of the frame $e^1$. One end of the spring $e^{43}$ is fixed to the rear wall of the frame $e^1$, and its opposite end is secured to a downwardly extending toothed arm $e^{46}$ fixed to the sleeve $e^{44}$ and engaged with the gear $e^{27}$, previously mentioned. A depending arm $e^{47}$ is fixed to the spindle $e^{45}$ and its free end detachably engages a shoulder projecting from the arm $e^{46}$, in order that the spindle and sleeve $e^{45}$ $e^{44}$ may move simultaneously in one direction, and independently in the opposite direction. The free end of the spindle $e^{45}$ projects beyond the front wall of the frame $e^1$ and is provided with a lever $e^{48}$, which is normally arranged in its position assumed at Figs. 5 and 6.

The lever $e^{48}$ is tilted upwardly after the operating pieces $e^8$ $e^9$ are suitably arranged for calling a desired circuit, and is then returned to its normal position. As the lever $e^{48}$ is tilted upwardly the arm $e^{47}$ engages the arm $e^{46}$ and moves the same against the action of the spring $e^{43}$ until a suitable stop $e^{49}$ limits the onward movement of the arm $e^{46}$. The spring $e^{43}$ is thus tensioned and the arm $e^{46}$ is restrained from return movement by the escapement for the support or disk $e^{37}$. The movement of the arm $e^{46}$ effected by the lever $e^{48}$, is, however, sufficient to completely revolve the gear $e^{27}$ meshing therewith, and thus detachably engage a tooth $e^{50}$ projecting from said gear with a movable dog $e^{51}$ secured to the support or disk $e^{37}$. The tooth $e^{50}$, and the dog $e^{51}$ are so constructed and arranged, that the gear $e^{27}$ when actuated by the arm $e^{47}$ is free to move in the same direction as indicated by arrow 3, Fig. 10, without rotating the support or disk $e^{37}$, and is afterward prevented from returning to its normal position, except when the escapement for the support or disk $e^{37}$ permits the operating pieces $e^8$ $e^9$ to continue their onward movement as effected by the spring $e^{43}$. After the gear $e^{27}$ has been completely revolved, as described, and has commenced its return movement, the lever $e^{48}$ is prevented from again revolving said gear in the same direction as that indicated by arrow 3, Fig. 10 until the terminal support $e^7$ has made a complete revolution. The means for preventing such movement of the gear $e^{27}$ may be of any desired form, size, and construction, but it preferably consists of a pivoted stop $e^{52}$, which engages the teeth of the gear $e^{27}$, and is forced out of engagement with said gear when the terminal support $e^7$ is in its normal position, by a cam $e^{53}$ secured to said terminal support.

After the lever $e^{48}$ is tilted upwardly as described for tensioning the spring $e^{43}$, it is returned to its normal position, and this movement of the lever $e^{48}$ from and to its normal position is utilized to actuate the escapement for the terminal support $e^7$ and thus permit the first advance or step of said support. This result may be accomplished by any suitable mechanism, but I preferably use the spring $e^{36}$ and arms $e^{54}$ $e^{55}$ secured respectively to the sleeve $e^{44}$, and the spindle $e^{34}$. As the lever $e^{48}$ is tilted upwardly the arm $e^{54}$ engages the arm $e^{55}$ and rocks the escapement dogs $e^{30}$ $e^{31}$ in one direction, and as the lever $e^{48}$ is reversely tilted said escapement dogs are moved in the opposite direction by the spring $e^{36}$, thus permitting the first advance or step of the terminal support $e^7$. The arm $e^{55}$ just described is engaged by a suitable stop when the movable parts of the controlling device $e$ are in their normal position. Consequently, when a calling current is passed through the line conductor $A^1$ for operating the signal $A^4$, the magnet $e^{21}$ which is simultaneously energized is unable to attract its armature, and the escapement for the terminal support $e^7$ is not actuated to permit an advance or step of said support. This stop may be of any desirable form, size, and construction, but it preferably consists of an arm $e^{56}$ fixed to the arm $e^{46}$ and normally engaged with the arm $e^{55}$, Fig. 10.

The escapement for controlling the movement of the operating pieces $e^8$ $e^9$, preferably consists of a toothed wheel $e^{57}$ and escapement dogs $e^{58}$ $e^{59}$ actuated by the magnet $e^{23}$. The wheel $e^{57}$ is supported on a shaft provided with a pinion $e^{60}$ meshing with gear teeth formed upon the periphery of the support or disk $e^{37}$ and the escapement dogs $e^{58}$ $e^{59}$ are of any suitable construction capable of permitting successive step by step movements of the wheel $e^{57}$. As here illustrated, the dogs $e^{58}$ $e^{59}$ resemble the ordinary escapement dogs of a typewriter carriage, and one dog $e^{58}$ is fixed to the armature of the magnet $e^{23}$ and the other dog $e^{59}$ is pivoted to said armature. As the magnet $e^{23}$ is energized, the dog $e^{58}$ is withdrawn from operative position and the wheel $e^{57}$ completes an advance movement or step, and is restrained from further movement by the dog $e^{59}$. The magnet $e^{23}$ is then deënergized and the armature therefor is returned to its normal position by a suitable spring, thus engaging the dog $e^{58}$ with the tooth of the wheel $e^{57}$, previously engaged by the dog $e^{59}$. As the shaft provided with the wheel $e^{57}$ is geared to the support or disk carrying the operating pieces $e^8$ $e^9$, said operating pieces are permitted to make an advance movement or step upon each movement or step of the wheel $e^{57}$.

The switching apparatus $a$ and the controlling device $e$ are preferably of such construction that their synchronism is always maintained, but I have deemed it advisable to so construct said controlling device that the position of the operating pieces $e^8$ $e^9$ may be adjusted by the subscriber, should the circuit called not correspond to the one represented by the indicators or hands $e^{38}$ $e^{39}$. This adjustment is effected by securing the toothed escapement wheel $e^{57}$ to a sleeve $e^{61}$ movable lengthwise on the shaft provided with the pinion $e^{60}$ for permitting disengagement of said toothed wheel and the escapement dog $e^{58}$. A suitable spring $e^{62}$ holds the sleeve $e^{61}$ in its normal position, and an aperture $e^{63}$ in the lower part of the frame $e^1$ permits engagement of said sleeve. The subscriber is enabled to readily determine when the operating pieces $e^8$ $e^9$ have reached the desired adjustment effected by disengaging the wheel $e^{57}$ from the dog $e^{58}$, as I preferably arrange an indicator or scale $e^{64}$ upon the outer face of the support or disk $e^{37}$. The graduations of the indicators $e^{42}$ $e^{64}$ are preferably similar and when the controlling device $e$ is in its normal position, corresponding graduations of both indicators are in alinement with each other. In order that this adjustment of the operating pieces of the controlling device $e$ may be readily apparent I have shown the indicators $e^{38}$ $e^{39}$ at Fig. 6 in their position assumed when the line conductors A $A^1$ are connected with the circuit represented by the combination indicator 21–40, and it will be noted that the graduation 40 of the indicator $e^{64}$ is alined with the graduation 0 of the indicator $e^{42}$. If, upon communicating with the subscriber of the circuit then connected to the line conductors A $A^1$, it should be ascertained that the circuit represented by the combination indicator 21–41 was connected to the line conductors A $A^1$, the user of the controlling device $e$ would then withdraw the toothed escapement wheel $e^{57}$ from engagement with the dog $e^{58}$, and rotate the support or disk $e^{37}$ until the graduation 41 of the indicator $e^{64}$ was alined with the graduation 0 of the indicator $e^{42}$, whereupon the synchronism of the switching apparatus $a$ and controlling device $e$ would be established, and, upon the return of the support or disk $e^{37}$ to its normal position the corresponding graduations of the indicators $e^{42}$ $e^{64}$ would be alined with each other.

The actuating piece $e^{10}$ may be of any desirable form, size, and construction, and is preferably utilized to control the electric connection of the telephone or communicator of a calling circuit desiring communication with the station $A^2$, and also to permit the terminal support $e^7$ to make its fifth advance or step for effecting the return movement of the switching apparatus $a$ after it has been utilized to connect another circuit with said station $A^2$. The actuating piece $e^{10}$ preferably consists of a lever suitably pivoted to the frame $e^1$, and, in order that the desired movements of the terminal support $e^7$ may be effected thereby, it is provided with upwardly projecting arms $e^{65}$ $e^{66}$ suitably secured thereto. The arm $e^{65}$ is utilized to reversely move the terminal support $e^7$ and is normally arranged directly beneath a projection or tooth $e^{67}$ formed or provided upon said terminal support. The telephone or communicator $A^3$ is normally engaged with the outer end of the actuating piece $e^{10}$ and its weight depresses said actuating piece against the action of a spring $e^{68}$. As the telephone $A^3$ is removed, when a call is directed to the signal $A^4$, the actuating piece $e^{10}$ is immediately elevated by the spring $e^{68}$, thus engaging the arm $e^{65}$ with the projection or tooth $e^{67}$ and reversely moving the terminal support $e^7$ against the action of the spring $e^{26}$. As previously stated, this movement of the terminal support connects the telephone $A^3$ in circuit with the line conductors A $A^1$, and deënergizes the magnet of the calling circuit which governs the movement of the terminal support of the controlling device of said circuit; but, as soon as the telephone $A^3$ is replaced in its normal position, the spring $e^{26}$ returns the terminal support $e^7$ to its initial position and the signal $A^4$ is again in circuit with the line conductor $A^1$.

When the controlling device $e$ has operated to connect another circuit with the conductors A $A^1$, and the magnet $e^{21}$ has been deënergized by the removal of the telephone of the called circuit, the terminal support $e^7$ has been permitted to make four advances or steps for connecting the telephone $A^3$ to the line conductors A $A^1$, and at Fig. 9, I have shown said terminal support in this position. The telephone $A^3$ is then moved from its normal position upon the cessation of the operation of the signal $A^4$, and the spring $e^{68}$ elevates the actuating piece $e^{10}$, whereupon the arm $e^{66}$ engages an arm $e^{69}$ projecting from the shaft $e^{34}$, and rocks the escapement dogs $e^{30}$ $e^{31}$ in one direction. After the desired communication has been obtained through the conductors A $A^1$ and the circuit connected therewith, the telephone $A^3$ is again placed in its normal position, and the actuating piece $e^{10}$ is depressed against the action of the spring $e^{68}$. The spring $e^{36}$ then moves the spindle $e^{34}$ to its normal position for rocking the escapement dogs $e^{30}$ $e^{31}$ in the opposite direction, and permitting the terminal support $e^7$ to make its fifth advance or step and ground the conductor A. The rack $a^{10}$ of the switching device $a$ then continues its onward movement, and after each advance or step thereof, the support or disk $e^{37}$ carrying the operating pieces $e^8$ $e^9$ is aluso advanced by the passage of current pulsations through the magnet $e^{23}$.

As the support or disk $e^{37}$ reaches its position immediately preceding its last advance or step, the operating piece $e^{25}$ is in position to engage the arm $e^{35}$ projecting from the spindle $e^{34}$. During this last advance or step, the arm $e^{35}$ is rocked upwardly and is immediately permitted to return to its normal position upon the action of the spring $e^{36}$, thus permitting the last advance or step of the terminal support $e^7$, whereupon the ground is connected to the conductor $A^1$ and is disconnected from the conductor A. It is very desirable that the actuating piece $e^{10}$ shall be free to effect an advance movement or step of the terminal support $e^7$ only when said support is in its position assumed when connecting the line conductors A $A^1$ for passing a current therethrough to the signal of the connected circuit. Consequently, the arm $e^{66}$ is held out of operative position by a shoulder $e^{70}$ upon said support which is provided with a flattened portion $e^{71}$ that permits the arm $e^{66}$ to assume its operative position. As the connection of the telephone of the calling circuit is dependent upon the removal of the telephone of the called station from its normal position, it is obvious that if the subscriber for said circuit is absent when his signal is operated the signals of both stations will continue to ring until the source of electric energy at the main station for effecting their operation is exhausted. To obviate this result I provide the controlling device $e$ with suitable releasing mechanism which may consist, as illustrated, of a pivoted lever $e^{72}$ having an arm $e^{73}$ for forcing the escapement dogs $e^{30}$ $e^{31}$ from operative position and permitting an advance movement or step of the terminal support $e^7$. To permit this movement of the dogs $e^{30}$ $e^{31}$, the end of the arm $e^{32}$ normally engaged with said dogs is suitably cut away and to prevent undue movement of the support $e^7$ a suitable stop arm $e^{74}$ on the lever $e^{72}$ enters a groove or cut-out in said support, and limits its movement. This groove or cut-out is only alined with the arm $e^{74}$ when the terminal support $e^7$ is in its position assumed for engaging the terminal $e^{15}$ with the fixed brushes or terminals $e^3$ $e^4$ and permitting the passage of a signaling current through the line conductors A A$^1$. When the terminal support $e^7$ is in any other position, the stop arm $e^{74}$ engages said support $e^7$ and prevents the movement of the lever $e^{72}$ necessary for forcing the dogs $e^{30}$ $e^{31}$ from operative position. It will also be understood that the movement of the support $e^7$ effected by the lever $e^{72}$ is sufficient to disengage the terminals $e^{15}$ $e^3$ $e^4$, and engage the terminals $e^{17}$, $e^6$, and that it is impossible for said support to stop its advance movement when the terminal $e^{16}$ is engaged with the fixed brushes or terminals $e^4$ $e^5$ and thus connect the telephone A$^3$ to the line conductors A A$^1$. As previously stated, the controlling devices $f$ $g$ are of the same construction as the controlling device $e$, and at Fig. 1 I have diagrammatically shown fixed brushes or terminals $f^2$ $f^3$ $f^4$ $f^5$ $f^6$, $g^2$ $g^3$ $g^4$ $g^5$ $g^6$, terminal supports $f^7$ $g^7$, movable terminals $f^{12}$ $f^{13}$ $f^{14}$ $f^{15}$ $f^{16}$ $f^{17}$ $f^{18}$, $g^{12}$ $g^{13}$ $g^{14}$ $g^{15}$ $g^{16}$ $g^{17}$ $g^{18}$; conductors $f^{20}$ $f^{22}$, $g^{20}$ $g^{22}$, magnets $f^{21}$ $f^{23}$, $g^{21}$ $g^{23}$, and resistance devices $f^{24}$ $g^{24}$ corresponding to the like parts $e^2$ $e^3$ $e^4$ $e^5$ $e^6$ $e^7$ $e^{12}$ $e^{13}$ $e^{14}$ $e^{15}$ $e^{16}$ $e^{17}$ $e^{18}$ $e^{20}$ $e^{22}$ $e^{21}$ $e^{23}$ $e^{24}$.

The controlling devices $e$ $f$ $g$ are important parts of my improved electric exchange system, and in order that they may be thoroughly understood, I will now briefly describe the steps of the operation of the controlling device $e$ and the circuits through said device for each operation thereof. When the controlling device $e$ is in its normal position, a calling current from a station desiring to communicate with the subscriber at the station A$^2$ is free to pass over the conductors or wires A$^1$ A$^6$, the terminals $e^3$ $e^{12}$, the spindle $e^{19}$, and the conductor or wire $e^{20}$ to the ground, and in its passage energizes the electric lamp $e^{24}$, the magnet of the signal A$^4$, and the magnet $e^{21}$. During the passage of said current, the stop $e^{56}$ prevents rocking of the spindle $e^{34}$ by the arm $e^{32}$, which forms the armature of the magnet $e^{21}$ and would otherwise be attracted thereby, and consequently, said magnet and the spring $e^{36}$ do not operate the escapement dogs $e^{30}$ $e^{31}$ and permit an advance or forward step of the support $e^7$. Upon the operation of the signal A$^4$ by said calling current, the subscriber removes the telephone A$^3$ from the actuating piece $e^{10}$, whereupon the spring $e^{68}$ elevates said actuating piece, and the arm $e^{65}$ engages the tooth $e^{67}$ upon the terminal support $e^7$ and reversely moves said support against the action of the spring $e^{26}$, thereby engaging the surface terminal $e^{18}$ with the fixed brushes or terminals $e^4$ $e^5$. This reverse movement of the terminal support $e^7$ deënergizes the magnet of the calling circuit which corresponds to the magnet $e^{21}$ of the device $e$, and the terminal support of the calling station is then automatically operated to connect the telephone of said calling station in metallic circuit with the line conductors or wires leading therefrom.

As the actuating piece $e^{10}$ is elevated, the arm $e^{66}$ carried thereby is also elevated but the shoulder $e^{70}$ upon the terminal support $e^7$ holds said arm out of its position assumed when about to engage the arm $e^{69}$ as presently described. When the terminals $e^{18}$ $e^4$ $e^5$ are connected, a talking current is free to pass over the conductors or wires A $e^{22}$, terminals $e^4$ $e^{18}$ $e^5$, and the conductor or wire A$^5$ to the telephone A$^3$ and thence over the conductor or wire A$^5$ to the line conductor or wire A$^1$. As soon as the conversation is finished, the subscriber replaces his telephone A$^3$ upon the actuating piece $e^{10}$ and the spring $e^{26}$ automatically returns the terminal support $e^7$ to its normal position for permitting the passage of a calling current from the line conductor or wire A$^1$ through the magnet of the signal A$^4$ to the ground, as previously pointed out.

The controlling device $e$ may be utilized to operate the switching apparatus $a$ for connecting another circuit with the conductors A A$^1$. In that event, the indicators or hands $e^{38}$ $e^{39}$ are rocked on the spindle $e^{19}$ to the desired position for permitting the operating pieces $e^8$ $e^9$ to enter the apertures $e^{41}$ in the support or disk $e^{37}$ corresponding to the circuit to be connected to the conductors A A$^1$. The lever $e^{43}$ is then tilted upwardly for tensioning the spring $e^{43}$ and operates to engage the arm $e^{47}$ with the arm $e^{55}$ and rock the escapement dog $e^{30}$ out of operative position. The lever $e^{48}$ is then returned to its normal position and the escapement dog $e^{81}$ is rocked from its operative position by the spring $e^{80}$, thus permitting the first advance or step of the terminal support which separates the terminals $e^{12}$ $e^3$ and engages the terminals $e^{13}$ $e^6$. The ground is then disconnected from the line conductor or wire $A^1$ and is connected to the line conductor or wire A, whereupon a grounded current passes from the conductor or wire A through the terminals $e^6$ $e^{13}$, the spindle $e^{10}$, and the conductor or wire $e^{20}$ to the ground, and in its passage energizes the magnet $a^{26}$ of the switching device $a$, and the magnet $e^{23}$ of the controlling device $e$.

The magnet $a^{26}$ operates to connect the rack $a^{10}$ to its motor $D^5$ for effecting each advance or step of said rack and upon each advance of the rack $a^{10}$ the magnet $e^{23}$ withdraws the dog $e^{58}$ from the wheel $e^{57}$ and permits the spring $e^{43}$ to advance the escapement wheel $e^{57}$ a single step by means of the arm $e^{46}$, the gear $e^{27}$, the support or disk $e^{37}$, and the pinion $e^{60}$. The support or disk $e^{37}$ carrying with it the operating pieces $e^8$ $e^9$ is also advanced a single step during each advance of the wheel $e^{57}$ and is prevented from additional movement by the engagement of the dog $e^{59}$ with one of the teeth of the escapement wheel $e^{57}$. The current flowing along the line conductor or wire A is broken by the feeding dog support $a^{17}$ of the switching apparatus at the commencement of each advance or step of the rack $a^{10}$ effected during the connection of the conductor A to the ground by the controlling device $e$, and, consequently as the line conductor A is broken, the magnet $e^{23}$ is deënergized and its armature is returned by a suitable spring to its normal position and engages the dog $e^{58}$ with the tooth of the wheel $e^{57}$, previously engaged by the dog $e^{59}$. When the feeding dog support $a^{17}$ returns to its normal position after each advance step of the rack $a^{10}$, it closes the break in the line conductor or wire A, whereupon a current again flows from said conductor or wire through the controlling device $e$ and the conductor or wire $e^{20}$ to the ground, and effects the corresponding advance or step of the support or disk $e^{37}$ carrying the operating pieces $e^8$ $e^9$. These advances or steps of the rack $a^{10}$ and the support $e^{37}$ continue until the desired movable terminal of the switching apparatus $a$ has assumed its operative position. The operating piece $e^8$ then engages the arm $e^{35}$ and coöperates with the spring $e^{36}$ for actuating the escapement dogs $e^{30}$ $e^{31}$ to permit the spring $e^{26}$ to effect the second advance or step of the drum $e^7$. The terminals $e^{14}$ $e^2$ are connected by said second advance or step, and when the feeding dog support $a^{17}$ engages the spring terminal $a^{38}$ a current is free to pass from the grounded source of electric energy at the main or common station D over the line conductor or wire $A^1$ and through the terminals $e^2$ $e^{14}$, the spindle $e^{19}$, and the conductor or wire $e^{20}$ to the ground. In its passage, this current energizes the magnet $a^{32}$ of the switching apparatus $a$ and the armature of said magnet withdraws the stop or dog $a^{34}$ from operative position, whereupon the dog $a^{33}$ connects the terminal support $a^4$ to the rack $a^{10}$. The support $a^4$ is then carried forward by the rack $a^{10}$ as the same continues its onward movement owing to the continued engagement of the terminals $e^{13}$ $e^6$ which are not disconnected by the second step of the terminal support $e^7$. Upon the first onward movement of the terminal support $a^4$ of the switching apparatus $a$, the spring $a^{36}$ is disconnected from the spring $a^{37}$ and thereby breaks the circuit through the line conductor or wire $A^1$.

The advance movement of the support or disk $e^{37}$ and the rack $a^{10}$ continues after the terminal support $a^4$ is locked to said rack as the terminals $e^{13}$ $e^6$ are still engaged, and when the movable terminal carried by said support $a^4$ and previously forced to its operative position, has engaged the predetermined fixed terminal, the operating piece $e^9$ engages the arm $e^{35}$ and coöperates with the spring $e^{36}$ for actuating the escapement dogs $e^{30}$ $e^{31}$, to permit the spring $e^{26}$ to effect the third advance or step of the drum $e^7$. The terminals $e^{13}$ $e^6$ $e^{14}$ $e^2$ are then disconnected and the terminals $e^{15}$ $e^3$ $e^4$ are connected, whereupon the current from the main or common station passes from the line conductor or wire A $e^{22}$ through the terminals $e^4$ $e^{15}$ $e^3$ and the conductor or wire $A^6$ to the line conductor or wire $A^1$, and then returns to the main or common station and passes through the terminal support $a^4$, and its movable terminal in operative position, to the fixed terminal $A^7$ engaged thereby, and thence through the normally grounded line conductor or wire of the subscriber's station with which communication is desired. In its passage, this current energizes the magnets of the signals at the calling and called stations and also energizes the magnet $e^{21}$, and as the called subscriber removes his telephone from the actuating piece of his controlling device, the terminal support or drum of said device is reversely moved and the connection to the ground of the normally grounded line conductor or wire leading to said device is broken. The signals of the calling and called stations then cease their operations and the magnet $e^{21}$ is deënergized. When the magnet $e^{21}$ is energized and deënergized as just stated, the arm $e^{32}$ utilized as the armature for the magnet $e^{21}$ is attracted toward the pole of said magnet and is withdrawn therefrom by the spring $e^{86}$. This movement of said arm actuates the escapement dogs $e^{30}$ $e^{31}$ to permit the spring $e^{26}$ to effect the fourth advance or step of the terminal support $e^7$ for disconnecting the terminals $e^{15}$ $e^3$ $e^4$ and connecting the terminals $e^{16}$ $e^4$ $e^5$. The talking current is then free to pass from the telephone $A^3$ through the conductor or wire $A^5$ to the line conductor or wire $A^1$, and from said telephone through the conductor or wire $A^6$, terminals $e^5$ $e^{16}$ $e^4$ and conductor or wire $e^{22}$ to the line conductor or wire A.

When about to communicate through the telephone $A^3$, the subscriber removes said telephone from the actuating piece $e^{10}$ and as the spring $e^{68}$ elevates said actuating piece, the arm $e^{66}$ registers with the flattened portion $e^{71}$ of the shoulder $e^{70}$ upon the terminal support $e^7$ and engages the arm $e^{69}$, thereby rocking the escapement dog $e^{30}$ from operative position. The telephone $A^3$ is replaced upon the actuating piece $e^{10}$ when the communication through said telephone is finished, and upon the descent of the actuating piece, the spring $e^{36}$ reversely moves the arm $e^{32}$ connected thereto and rocks the escapement dog $e^{31}$ from operative position, whereupon the spring $e^{26}$ effects the fifth advance or step of the support $e^7$. The terminals $e^{16}$ $e^4$ $e^5$ are then disconnected and the terminals $e^{17}$ $e^6$ are connected, thereby permitting the passage of a current from the line conductor or wire A through the terminals $e^6$ $e^{17}$, the spindle $e^{19}$, and the conductor or wire $e^{20}$ to the ground. The passage of this current effects a continuous step by step advance of the support or disk $e^{37}$ and the rack $a^{10}$ carrying the terminal support $a^4$. Upon the last advance of the rack $a^{10}$, said rack and the terminal support $a^4$ automatically return to their normal position, and as the support or disk $e^{37}$ completes its revolution, the operating piece $e^{25}$ secured thereto engages the arm $e^{35}$ and coöperates with the spring $e^{36}$ for actuating the escapement dogs $e^{30}$ $e^{31}$ to permit the spring $e^{26}$ to effect the sixth and last advance or step of the terminal support $e^7$. The controlling device $e$ is then in its normal position and a grounded current is free to pass therethrough from the line conductor $A^1$ to the ground for operating the signal $A^4$.

In order that the operation of my invention will be clearly understood, let it be supposed that the subscriber of station $A^2$ desires to communicate with the subscriber of station $C^2$, and that the latter circuit is represented by the combination indicator 3—11. The operating pieces $e^8$ $e^9$ are alined with the 3rd and 11th graduations of the indicator $e^{42}$; the lever $e^{48}$ is elevated and depressed for tensioning the spring $e^{43}$, disconnecting the ground from the conductor $A^1$, and connecting said ground to the conductor A; and the controlling device $e$ is then operated automatically by the spring $e^{43}$ until the indicator $e^{30}$ is in alinement with the graduation O of the indicator $e^{42}$ as seen at Fig. 5. During this operation of the controlling device $e$, the operating piece $e^8$ actuates the support $e^7$ to permit the passage of a current over the conductor $A^1$, for connecting the rack $a^{10}$ to the terminal support $a^4$ after the terminal $a^3$ assumes its operative position, and the operating piece $e^9$ actuates said terminal support $e^7$ to connect the conductors A $A^1$, for permitting the passage of the signaling current through the line conductors A $A^1$, whence it passes through the normally grounded line conductor leading from the contact-terminal 8/$C^7$. The signals $A^4$ $C^4$ connected to the conductors $A^1$ $C^1$ are operated by said signaling current, and as soon as the telephone $C^3$ is withdrawn from operative position, the terminal support $e^7$ connects said telephone to the conductors C $C^1$ and breaks the ground from the conductor $C^1$, thus deënergizing the magnet $e^{21}$ which permits the terminal support $e^7$ to connect the telephone $A^3$ to the conductors A $A^1$. The telephones $C^3$ $A^3$ are then connected over a metallic circuit comprising station conductor $C^5$, line conductor $C^1$, movable conductor $C^{10}$, circuit breaker $C^9$, cross conductor $C^8$, fixed contact-terminal 8/$C^7$, movable terminal $a^3$, conductor $a^6$, movable conductor $A^{10}$, line conductor $A^1$, station conductor $A^5$, terminals $e^5$ $e^{16}$ $e^4$, station conductor $e^{22}$, line conductor A, main or common conductor $D^1$ in circuit with the switching apparatus $a$ $b$ $c$ which are connected, respectively, to the conductors A $A^1$ B $B^1$ and C $C^1$, line conductor C, station conductor $g^{22}$, terminals $g^4$ $g^{16}$ $g^5$ to station conductor $C^5$. After the desired communication has been obtained, the telephones $A^3$ $C^3$ are returned to their normal position and the terminal supports $e^7$ $g^7$ automatically assume their initial positions.

My invention will now be readily understood upon reference to the foregoing description and the accompanying drawings, and it will be evident to one skilled in the art that it is particularly simple, practical, and effective, and possesses features of great advantage and merit. It will also be understood that without departing from the spirit of my invention considerable change may be made in the switching apparatus and the controlling devices, as clearly indicated in the foregoing description.

Having thus fully described my invention, what I claim as new and desire to secure by Letters Patent, is:—

1. An electric exchange system comprising a main station, a series of circuits leading to the main station, a switching apparatus at the main station for connecting one circuit with any of the others, a current generator at the main station for controlling the operation of the switching apparatus, a subscriber's controlling device for governing the passage of the current from said generator, and means at the main station connected to the switching apparatus and to the circuit connecting said controlling device and switching apparatus, for automatically governing the operation of the controlling device, substantially as and for the purpose described.

2. An electric exchange system comprising a main station, a series of circuits leading to the main station, a subscriber's controlling device connected to one circuit for controlling the passage of the current therethrough, a switching apparatus connected to said one of the circuits for connecting the same with the other circuits, a motor connected to the switching apparatus for intermittently actuating the same, and means at the main station connected to the switching apparatus and to the circuit connecting said controlling device and switching apparatus, and operated by each advance movement or step of the switching apparatus for governing the operation of the controlling device, substantially as and for the purpose specified.

3. An electric exchange system comprising a series of circuits, a switching apparatus connected to each of said circuits for connecting one circuit with any of the other circuits, a continuously moving motor for actuating the switching apparatus, normally disconnected therefrom, connections between the switching apparatus and the motor for controlling the movement of the switching apparatus, a controlling device connected to said one of the circuits for governing the operation of the connections, and means connected to the switching apparatus for governing the operation of the controlling device, substantially as and for the purpose set forth.

4. An electric exchange system comprising a series of circuits provided with longitudinally extending fixed contact-terminals, each contact-terminal being connected to one of the circuits, a series of switching apparatus provided with movable terminals connected to corresponding circuits and movable across the contact-terminals, whereby each switching apparatus connects the corresponding circuit with any of the other circuits, a motor for actuating the switching apparatus, connections between each switching apparatus and the motor for intermittently connecting each switching apparatus to the motor, electro-magnets for operating said connections, and means for automatically breaking the circuits to the electro-magnets during the operation of the connections between the switching apparatus and the motor, substantially as and for the purpose set forth.

5. An electric exchange system comprising a main station, a series of metallic circuits leading to the main station, a subscriber's controlling device connected to one of the circuits for automatically governing the passage of the current therethrough, an automatic switching device connected to said one of the circuits for connecting the same with the other circuits, and means at the main station connected to the switching apparatus and to the circuit connecting said controlling device and switching apparatus for automatically governing the operation of the controlling device, substantially as and for the purpose described.

6. An electric exchange system comprising a main station, a series of metallic circuits leading to the main station and provided with sub-stations, a current generator at the main station connected to one of the circuits for passing a current therethrough, a subscriber's controlling device at the sub-station connected to said one of the circuits for automatically governing the passage of the current therethrough, a switching apparatus at the main station for connecting said circuit with the other circuits, and means at the main station connected to the switching apparatus and to the circuit connecting said controlling device and switching apparatus for automatically governing the operation of the controlling device, substantially as and for the purpose set forth.

7. An electric exchange system comprising a series of metallic circuits, an automatic switching apparatus for connecting one of the circuits with the others, said switching apparatus being provided with separate electrically controlled mechanisms connected to the respective conductors of said one of the circuits for controlling the operation of the switching apparatus, and an automatically operating controlling device for governing the passage of the current through said conductors to said mechanisms, and thereby controlling the operation of the switching apparatus, substantially as and for the purpose specified.

8. An electric exchange system comprising a series of metallic circuits having corresponding wires normally connected and their opposite wires normally disconnected, and provided with longitudinally extending fixed contact terminals, a series of switching apparatus provided with movable terminals connected to the normally disconnected wires of the circuits and movable across the contact terminals for connecting said disconnected wires, whereby each switching apparatus connects the corresponding circuit with any of the other circuits, a motor for actuating the switching apparatus, connections between each switching apparatus, and the motor for independently connecting each switching apparatus to the motor, electromagnets for actuating said connections, and means for breaking the circuits to the electro-magnets when the corresponding switching apparatus are connected to the motor, substantially as and for the purpose described.

9. An electric exchange system comprising a series of metallic circuits, each provided with a fixed longitudinally extending contact-terminal, a series of switching apparatus each provided with a terminal connected to the corresponding circuit, and movable across the contact-terminals for connecting the corresponding circuit with any of the other circuits, separate electrically controlled mechanisms connected to the respective conductors of each circuit for controlling the operation of the corresponding switching apparatus, controlling devices connected to the circuits for automatically governing the passage of the current to said mechanisms, and means connected to the switching apparatus for governing the operation of the controlling devices, substantially as and for the purpose specified.

10. An electric exchange system comprising a main station, a series of circuits leading to the main station and provided with sub-stations, a current generator at the main station connected to one of the circuits for passing a current therethrough, a controlling device at the sub-station connected to said one of the circuits for automatically governing the passage of the current therethrough, a switching apparatus at the main station for connecting said circuit with the other circuits, said switching apparatus being provided with a member movable from its normal position for effecting the desired connection made by the switching apparatus and automatically returnable to its normal position, means connected to the switching apparatus and the circuit connecting said controlling device and switching apparatus for automatically governing the operation of the controlling device, a stop for normally preventing the return movement of said member, and means connected to said member and automatically operated thereby for forcing the stop from operative position and permitting return movement of the member, substantially as and for the purpose specified.

11. An electric exchange system comprising a series of circuits, a switching apparatus connected to one of the circuits, and provided with a plurality of terminals for connecting said circuit with the others, mechanism for forcing the desired terminal into operative position, a motor for actuating the switching apparatus, connections between the switching apparatus and the motor for connecting the switching apparatus to the motor, an electro-magnet for operating said connections, and means for breaking the circuit to the electro-magnet when the switching apparatus is connected to the motor, substantially as and for the purpose set forth.

12. An electric exchange system comprising a main station, a series of metallic circuits, leading to the main station and each provided with a fixed longitudinally extending contact-terminal, a series of switching apparatus at the main station each provided with a terminal support, a plurality of terminals independently movable on said support and movable across the fixed contact-terminals, for connecting the corresponding circuit with the other circuits, means for electrically connecting the movable terminals to the corresponding circuit, and with separate electrically controlled mechanisms connected to the respective conductors of said circuit for controlling the operation of the switching apparatus, substantially as and for the purpose described.

13. An electric exchange-system comprising a series of circuits and a switching apparatus connected to one of the circuits and provided with a movable terminal-support, a plurality of terminals carried by the movable terminal-support for connecting said one of the circuits with any of the other circuits, said terminals being movable independently into their operative position and being normally electrically disconnected from said one of the circuits, and means for electrically connecting the terminal to said one of the circuits, substantially as and for the purpose described.

14. An electric exchange system comprising a series of circuits each provided with a fixed longitudinally extending contact-terminal, a series of switching apparatus connected to the circuits and each provided with a terminal support, a plurality of terminals independently movable on said support and movable across the fixed contact-terminals for connecting the corresponding circuit with the other circuits, said terminals being electrically disconnected from the corresponding circuits, and means for electrically connecting the terminals to their supports, substantially as and for the purpose described.

15. An electric exchange system comprising a main station, a series of circuits leading to the main station and each provided with a fixed longitudinally extending contact-terminal, a series of switching apparatus connected to the circuits and each provided with a plurality of terminals movable across the fixed contact-terminals and connected to the corresponding circuit for connecting said circuit with the other circuits, a subscriber's controlling device connected to one of the circuits for governing the passage of the current therethrough, and means at the main station connected to the corresponding switching apparatus and to the circuit connecting said controlling device and switching apparatus for automatically governing the operation of said controlling device, substantially as and for the purpose specified.

16. An electric exchange system comprising a main station, circuits leading to the main station and having a series of common fixed terminals, a switching apparatus for each circuit said switching apparatus being located at the main station and being each provided with separate electrically operated mechanisms connected to respective conductors of the corresponding circuit, and a controlling device for each circuit connected to the respective conductors of said circuit and provided with electric-conducting means for controlling the passage of the currents over said conductors and governing the operation of said mechanisms, and connected adjustable operating pieces for automatically regulating the operation of the electric-conducting means, substantially as and for the purpose set forth.

17. An electric exchange system comprising a main station, a series of circuits leading to the main station, a switching apparatus at the main station for connecting one of said circuits to the other circuits said switching apparatus being provided with separate electrically operated mechanisms connected to respective conductors of said one of the circuits, and a controlling device connected to said circuit and provided with electric-conducting means for controlling the passage of the currents over said conductors and governing the operation of said mechanisms, connected operating pieces adjustable toward and away from each other for automatically regulating the operation of the electric-conducting means for controlling the hands for indicating the position of the connected operating pieces, substantially as and for the purpose specified.

18. An electric exchange system comprising a main station, a series of circuits leading to the main station, a switching apparatus at the main station for connecting one of said circuits to the other circuits said switching apparatus being provided with independent electrically operated mechanisms connected to respective conductors of said one of the circuits, and a controlling device connected to said circuit and provided with electric-conducting means for controlling the passage of the current over said circuit, and effecting the independent operation of said mechanisms, connected operating pieces adjustable toward and away from each other for automatically regulating the operation of the electric-conducting means, and an indicator having graduations arranged in proximity to the path of said operating pieces, substantially as and for the purpose set forth.

19. An electric exchange system comprising a main station, a series of circuits leading to the main station, a switching apparatus for connecting one of said circuits to the other circuits provided with electrically operated mechanism connected to said one of the circuits, a controlling device connected to said circuit and provided with indicating graduations, electric-conducting means for controlling the passage of the current over said circuit and governing the operation of said mechanism, independently adjustable operating pieces for automatically regulating the operation of the electric-conducting means, mechanism for automatically moving the operating pieces, means at the main station for controlling the operation of said mechanism, and indicators or hands movable in proximity to the graduations for indicating the position of the operating pieces, substantially as and for the purpose specified.

20. An electric exchange-system comprising a series of circuits provided with sub-stations having signals, a main station provided with a switching apparatus for connecting one circuit with the others, a current-generator at the main station, and means at one of the sub-stations for completing the circuit between the generator and the switching apparatus, for automatically breaking the circuit between the generator and the switching apparatus and for automatically completing the circuit between the generator and the signal at another of the sub-stations, substantially as and for the purpose set forth.

21. An electric exchange-system comprising a main station, a series of circuits provided with sub-stations having signals, a current-generator at the main station, a switching apparatus at the main station for connecting a line-conductor of one of the circuits to a line-conductor of a second circuit, having its signal in circuit with the latter conductor, and means at the sub-station of said one of the circuits for completing the circuit between the generator and a second line-conductor of said one of the circuits, and for connecting said second line-conductor at said sub-station to the first line-conductor and completing the circuit between the generator, the first and second line-conductors of said one of the circuits, said line-conductor of the second circuit, and the signal in circuit with the latter line-conductor, substantially as and for the purpose specified.

22. An electric exchange-system comprising a main station, a series of circuits provided with sub-stations having signals, a current-generator at the main station, a switching apparatus at the main station for connecting a line-conductor of one of the circuits to a line-conductor of a second circuit, having its signal in circuit with the latter conductor, and a controlling device provided with means for automatically completing the circuit between the generator, a second line-conductor of said one of the circuits, and the ground, and for automatically breaking said circuit and connecting said second line-conductor at said sub-station to the first line-conductor and completing the circuit between the generator, the first and second line-conductors of said one of the circuits, said line-conductor of the second circuit, and the signal in circuit with the latter line-conductor, substantially as and for the purpose set forth.

23. An electric exchange-system comprising a main station, a series of circuits provided with sub-stations having signals, a current-generator at the main station, a switching apparatus at the main station for connecting a line-conductor of one of the circuits to a line-conductor of a second circuit, having its signal in circuit with the latter conductor, and means at the sub-station of said one of the circuits for completing the circuit between the generator and a second line-conductor of said one of the circuits, for connecting said second line-conductor at said sub-station to the first line-conductor and completing the circuit between the generator, the first and second line-conductors of said one of the circuits, said line-conductor of the second circuit, and the signal in circuit with the latter line-conductor, and for breaking the latter circuit and stopping the operation of the signal in circuit with said latter line-conductor, substantially as and for the purpose specified.

24. An electric exchange-system comprising a main station, a series of circuits provided with sub-stations having signals, a current-generator at the main station, a switching apparatus at the main station for connecting a line-conductor of one of the circuits to a line-conductor of a second circuit having its signal in circuit with the latter conductor, and a controlling device provided with means for automatically completing the circuit between the generator, a second line-conductor of said one of the circuits, and the ground, for automatically breaking said circuit and connecting said second line-conductor at said sub-station to the first line-conductor and completing the circuit between the generator, the first and second line-conductors of said one of the circuits, said line-conductor of the second circuit, and the signal in circuit with the latter line-conductor, and for breaking the latter circuit and stopping the operation of the signal in circuit with said latter line-conductor, substantially as and for the purpose set forth.

25. An electric exchange-system comprising a main station, a series of circuits provided with sub-stations having signals, a current-generator at the main station, a switching apparatus at the main station for connecting a line-conductor of one of the circuits to a line-conductor of a second circuit having its signal in circuit with the latter conductor, means at the sub-station of said one of the circuits for completing the circuit between the generator and a second line-conductor of said one of the circuits, and for connecting said second line-conductor at said sub-station to the first line-conductor and completing the circuit between the generator, the first and second line-conductors of said one of the circuits, said line-conductor of the second circuit, and the signal in circuit with the latter line-conductor, and means at the sub-station of the second circuit for connecting said line-conductor of the second circuit at the sub-station of the second circuit to a second line-conductor of said second circuit, substantially as and for the purpose described.

26. An electric exchange-system comprising a main station, a series of circuits provided with sub-stations having signals, a current-generator at the main station, a switching apparatus at the main station for connecting a line-conductor of one of the circuits to a line-conductor of a second circuit, having its signal in circuit with the latter conductor, a controlling device provided with means for automatically completing the circuit between the generator, a second line-conductor of said one of the circuits, and the ground, and for automatically breaking said circuit and connecting said second line-conductor at said sub-station to the first line-conductor and completing the circuit between the generator, the first and second line-conductors of said one of the circuits, said line-conductor of the second circuit, and the signal in circuit with the latter line-conductor, and means at the sub-station of the second circuit for connecting said line-conductor of the second circuit at the sub-station of the second circuit to a second line-conductor of said second circuit, substantially as and for the purpose set forth.

27. An electric exchange-system comprising a main station, a series of circuits provided with sub-stations having signals, a current-generator at the main station, a switching apparatus at the main station for connecting a line-conductor of one of the circuits to a line-conductor of a second circuit, having its signal in circuit with the latter conductor, electric communicators at the sub-stations normally disconnected from the circuits, a controlling device at the sub-station of said one of the circuits for completing the circuit between the generator and a second line-conductor of said one of the circuits, and for connecting said second line-conductor at said sub-station to the first line-conductor and completing the circuit between the generator, the first and second line-conductors of said one of the circuits, said line-conductor of the second circuit, and the signal in circuit with the latter line-conductor, said controlling device being provided with means for connecting the electric communicator at said station to the adjacent circuit, and means at the sub-station of the second circuit for controlling the operation of said means of the controlling device, substantially as and for the purpose described.

28. The combination of a terminal-support movable lengthwise, a plurality of terminals carried by the support and movable independently, said terminals being normally arranged in their inoperative positions, a reciprocating member movable lengthwise of the support for forcing the desired terminal into operative position, and electrically controlled mechanism for forcing said support and reciprocating member into operative position, substantially as and for the purpose set forth.

29. The combination of a series of electric circuits, a longitudinally movable support provided with a plurality of terminals for connecting one of the circuits with the other circuits, said terminals being normally electrically disconnected from the corresponding circuit, a rack movable lengthwise of the support for electrically connecting the desired terminal with the corresponding circuit, and movable with said support for moving said terminal to the desired position, means for connecting the rack to the support, a dog for feeding the rack, a support for operating the dog connected thereto with a lost motion, and electrically controlled mechanism for forcing said support and the desired terminal into operative position, substantially as and for the purpose set forth.

30. The combination of a series of electric circuits, a movable support provided with a plurality of terminals for connecting one of the circuits with the other circuits, a rack normally disconnected from the support for moving the same to the desired position, a magnet for automatically connecting the rack to the support, and an electrically controlled feed for the rack; substantially as and for the purpose described.

31. The combination of a series of electric circuits, a movable support provided with a rack and a terminal for connecting one of the circuits with the other circuits, a stop for preventing return movement of the support, a movable operating piece for forcing the stop from operative position connected to the support whereby the operating piece is automatically actuated by the support, substantially as and for the purpose specified.

32. The combination of a series of electric circuits, a movable support provided with a terminal for connecting one of the circuits with the other circuits, a feed for forcing the support from its normal position, a continuously rocking shaft normally disconnected from the feed, and electrically operated mechanism for connecting the feed to the shaft and governing the movement of the support, substantially as and for the purpose set forth.

33. The combination of a series of electric circuits, a movable support provided with a terminal for connecting one of the circuits with the other circuits, a feed for forcing the support from its normal position, a continuously rocking shaft normally disconnected from the feed, electrically operated mechanism for connecting the feed to the shaft and governing the movement of the support, and a circuit breaker for automatically breaking the circuit to said mechanism upon each movement of the support, substantially as and for the purpose set forth.

34. The combination with a series of circuits converging at a main station, a switching apparatus for connecting one of the circuits with the other circuits, said switching apparatus being provided with ground-connections at the main station for connecting both conductors of said one of the circuits to the ground, and means for breaking the circuit between one of said conductors to the ground at the main station; of a connecting device for automatically controlling the operation of the switching apparatus, said connecting device comprising in its organization, a normal ground-connection, mechanism for controlling the passage of a predetermined number of current-pulsations over one conductor of said one of the circuits to earth at the main station and through the ground-connection of the connecting device, means for controlling the passage of one or more current-pulsations over the other conductor of said metallic circuit to earth at the main station and through the ground-connection of the connecting device, and means for breaking the circuit from said conductors to the ground-connection and for connecting together both conductors of said circuit, substantially as and for the purpose described.

35. An automatic electric exchange system comprising a series of circuits converging at a main station, and each provided with a sub-station and a plurality of line-conductors, a switching mechanism having a plurality of contact-terminals, a separate terminal-support for each circuit provided with a plurality of movable terminals, ground-connections for connecting conductors of each circuit to the ground, and means for breaking the circuit between one of said conductors to the ground at the main station, a current-generator suitably connected to the switching mechanism for controlling the operation of said mechanism, and connecting devices located at the sub-station of the metallic circuits for controlling the operation of the current-generator, said connecting devices being each provided with ground-connections for connecting the conductors of the corresponding circuit to the ground, means for making and breaking the circuit between said conductors and ground-connections, and operating pieces for actuating said means, said operating pieces being capable of assuming a plurality of positions, substantially as and for the purpose specified.

In testimony whereof I have hereunto signed my name in the presence of two attesting witnesses, at Syracuse, in the county of Onondaga in the State of New York this 18th day of May 1895.

ALEXANDER T. BROWN.

Witnesses:
  E. A. WEISBURG,
  H. E. CHACE.